(12) United States Patent
Sasaki

(10) Patent No.: US 12,723,639 B2
(45) Date of Patent: Sep. 1, 2026

(54) SPEED REDUCER

(71) Applicant: NIPPON THOMPSON CO., LTD., Tokyo (JP)

(72) Inventor: Satoshi Sasaki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 4 days.

(21) Appl. No.: 18/856,977

(22) PCT Filed: Feb. 6, 2023

(86) PCT No.: PCT/JP2023/003747

§ 371 (c)(1),
(2) Date: Oct. 15, 2024

(87) PCT Pub. No.: WO2023/210094

PCT Pub. Date: Nov. 2, 2023

(65) Prior Publication Data

US 2025/0257790 A1 Aug. 14, 2025

(30) Foreign Application Priority Data

Apr. 25, 2022 (JP) ................................ 2022-071624

(51) Int. Cl.
*F16H 1/32* (2006.01)
*F16C 35/063* (2006.01)

(52) U.S. Cl.
CPC ............ *F16H 1/32* (2013.01); *F16C 35/063* (2013.01); *F16C 2361/61* (2013.01); *F16H 2001/325* (2013.01)

(58) Field of Classification Search
CPC ............................ F16H 2001/325; F16H 1/32
See application file for complete search history.

(56) References Cited

U.S. PATENT DOCUMENTS 1,125,091 A * 1/1915 Gray ........................ F16H 1/32 74/6
1,770,035 A * 7/1930 Heap ........................ F16H 1/32 475/159

(Continued)

FOREIGN PATENT DOCUMENTS

CN 102889338 A 1/2013
CN 110094466 A * 8/2019 .............. F16H 1/32

(Continued)

OTHER PUBLICATIONS

Oct. 7, 2025 Office Action issued in Japanese Patent Application No. 2022-071624.

(Continued)

*Primary Examiner* — Sherry L Estremsky
(74) *Attorney, Agent, or Firm* — Oliff PLC

(57) ABSTRACT

A speed reducer includes: an input unit including an input shaft and first bearing including eccentric first inner ring rotating together with the input shaft; cycloid gear; multiple inner pins, inner pin holder holding end portions of the inner pins in the axial directions and surrounding the input unit outer peripheral surface; second bearing radially outward of the cycloid gear and including a second inner ring as an output shaft, second outer ring radially outward of the second inner ring, and rolling body between the second inner and rings; and a plurality of outer pins held on a radially inner surface of the second inner ring and meshing with external teeth of the cycloid gear. The first inner ring is separate from the input shaft. The input unit includes a movement restrictor restricting movement of the first inner ring relative to the input shaft in the circumferential directions.

15 Claims, 28 Drawing Sheets

(56) References Cited

U.S. PATENT DOCUMENTS

| | | | | | |
|---|---|---|---|---|---|
| 3,160,032 | A * | 12/1964 | Black | F16H 1/32 74/462 |
| 7,901,317 | B2 * | 3/2011 | Yamamoto | F16H 1/32 475/168 |
| 9,252,641 | B2 * | 2/2016 | Ishizuka | H02K 7/116 |
| 12,044,294 | B2 * | 7/2024 | Sasaki | F16H 57/0427 |
| 2014/0371019 | A1 | 12/2014 | Miyoshi | |
| 2017/0059029 | A1 | 3/2017 | Sasaki | |

FOREIGN PATENT DOCUMENTS

| | | | | |
|---|---|---|---|---|
| CN | 114396460 | A * | 4/2022 | F16H 57/027 |
| GB | 1245012 | A * | 9/1971 | F16H 1/32 |
| JP | 2000-161449 | A | 6/2000 | |
| JP | 2003-021198 | A | 1/2003 | |
| JP | 2013-064450 | A | 4/2013 | |
| JP | 2017-048852 | A | 3/2017 | |
| JP | 2018-128072 | A | 8/2018 | |
| JP | 6736223 | B2 * | 8/2020 | |
| KR | 2014-0062131 | A | 5/2014 | |
| WO | WO-2013008492 | A1 * | 1/2013 | F16H 1/32 |

OTHER PUBLICATIONS

Apr. 25, 2023 Search Report issued in International Patent Application No. PCT/JP2023/003747.

Feb. 3, 2026 Office Action issued in Japanese Patent Application No. 2022-071624.

Apr. 10, 2026 Office Action issued in Korean Application No. 10-2024-7032619.

* cited by examiner

SPEED REDUCER

TECHNICAL FIELD

The present disclosure relates to a speed reducer. This application claims priority to Japanese Patent Application No. 2022-071624, which was filed on Apr. 25, 2022, and is incorporated herein by reference in its entirety.

BACKGROUND ART

Speed reducers have been used to date in control units for driving wheels in mobile devices, robots, and machine tools. Patent Literature 1, for example, describes a technique of this type.

A speed reducer described in Patent Literature 1 includes an input shaft including a pair of eccentric portions, a pair of cycloid gears to be in contact with the pair of eccentric portions, a hub serving as an output shaft, an output shaft pin holder, a plurality of outer pins, an outer pin holder holding the outer pins, and an inner pin supported by the hub. The hub is supported by the outer pin holder through a crossed roller bearing. The crossed roller bearing includes an outer ring fixed to the outer pin holder, an inner ring fixed to the hub, and a plurality of rollers between the outer ring and the inner ring.

CITATION LIST

Patent Literature

Patent Literature 1: Japanese Patent Application Laid-Open No. 2017-48852

SUMMARY OF INVENTION

Technical Problem

In speed reducers, improved productivity is required. Additionally, ensuring stable operation is also required. The technique disclosed in Patent Literature 1 is insufficient in terms of improvement of productivity and ensuring stable operation.

It is therefore an object to provide a speed reducer capable of ensuring stable operation with improved productivity.

Solution to Problems

A speed reducer according to the present disclosure includes: an input unit including an input shaft and a first bearing, the first bearing including an eccentric first inner ring that rotates together with the input shaft; a cycloid gear located radially outward of the first bearing and including a plurality of external teeth arranged on an outer peripheral surface along circumferential directions, the cycloid gear including a first through hole the input unit penetrates and a plurality of second through holes located radially outward of the first through hole and arranged with intervals in the circumferential directions; a plurality of inner pins penetrating the second through holes in axial directions; an inner pin holder holding end portions of the plurality of inner pins in the axial directions and surrounding an outer peripheral surface of the input unit; a second bearing located radially outward of the cycloid gear, and including a second inner ring that is an output shaft, a second outer ring located radially outward of the second inner ring, and a rolling body located between the second inner ring and the second outer ring; and a plurality of outer pins held on a radially inner surface of the second inner ring and meshing with the external teeth of the cycloid gear. The first inner ring is provided separately from the input shaft. The input unit includes a movement restrictor that restricts movement of the first inner ring relative to the input shaft in the circumferential directions.

Advantages of Invention

The speed reducer is capable of ensuring stable operation with improved productivity.

DESCRIPTION OF EMBODIMENTS

Summary of Embodiment

Figure 1:
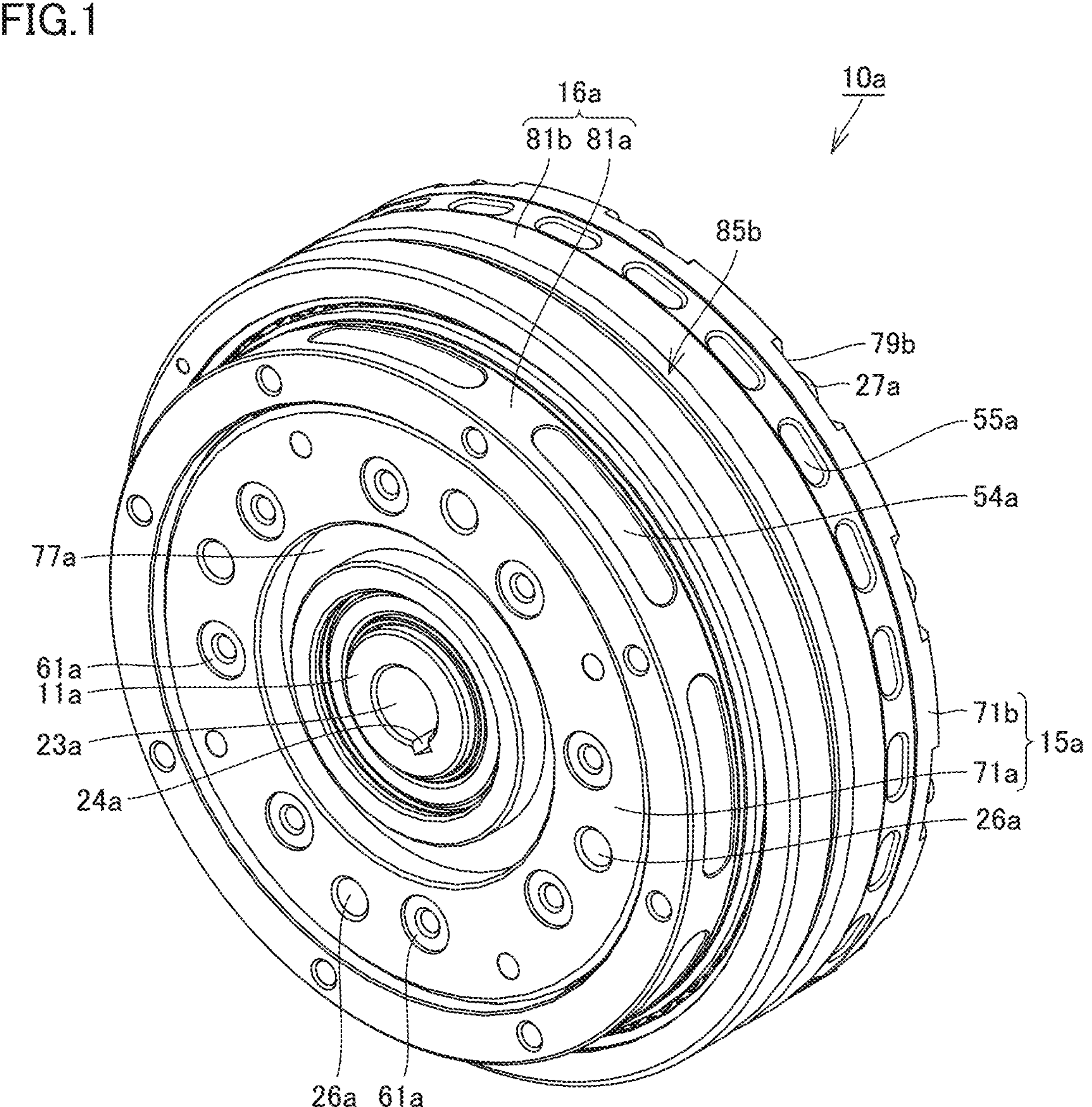
FIG. 1 is a schematic perspective view illustrating a speed reducer according to a first embodiment of the present disclosure.

A speed reducer according to the present disclosure includes: an input unit including an input shaft and a first bearing, the first bearing including an eccentric first inner ring that rotates together with the input shaft; a cycloid gear located radially outward of the first bearing and including a plurality of external teeth arranged on an outer peripheral surface along circumferential directions, the cycloid gear including a first through hole the input unit penetrates and a plurality of second through holes located radially outward of the first through hole and arranged with intervals in the circumferential directions; a plurality of inner pins penetrating the second through holes in axial directions; an inner pin holder holding end portions of the plurality of inner pins in the axial directions and surrounding an outer peripheral surface of the input unit; a second bearing located radially outward of the cycloid gear, and including a second inner ring that is an output shaft, a second outer ring located radially outward of the second inner ring, and a rolling body located between the second inner ring and the second outer ring; and a plurality of outer pins held on a radially inner surface of the second inner ring and meshing with the external teeth of the cycloid gear. The first inner ring is provided separately from the input shaft. The input unit includes a movement restrictor that restricts movement of the first inner ring relative to the input shaft in the circumferential directions.

With this configuration, the input shaft and the first inner ring that are components of the input unit can be made of different materials. Then, a material suitable for the function required for each component can be selected to assemble the input unit. In this case, since the input unit includes the movement restrictor that restricts movement of the first inner ring relative to the input shaft in the circumferential directions, the first inner ring can be reliably positioned in the circumferential directions, and the first inner ring can be reliably rotated together with the input shaft. Accordingly, stable operation of the speed reducer can be ensured. In addition, since the components are made of separate members, accuracy in grinding of, for example, the eccentric first inner ring can be easily increased so that productivity can be thereby enhanced. Further, since the first inner ring is a separate member, a change of eccentricity of the first inner ring and sorting of accuracy, which would be difficult in an integrated input unit, can be easily performed. That is, the first inner rings fabricated in accordance with requirements can be selected and combined with the separately fabricated input shaft to produce the input unit that meets requirements. Since the input shaft is also a separate member, it becomes easier to perform additional machining on the input shaft or incorporate design changes according to an application. Specifically, a material such as a light metal exemplified by aluminum or a resin is employed as a material of the input shaft that is a component constituting the input unit in consideration of weight reduction and torque resistance, whereas bearing steel is employed as a material for the first inner ring in consideration of enhancement of durability. The speed reducer described above can ensure stable operation with enhanced productivity.

In the speed reducer, the movement restrictor may restrict movement of the first inner ring relative to the input shaft in the axial directions. Thus, the first inner ring in the axial directions is reliably positioned, thereby ensuring more stable operation of the speed reducer.

In the speed reducer, the movement restrictor includes the first keyway recessed from the outer peripheral surface of the input shaft, the second keyway recessed from the inner peripheral surface of the first inner ring, and the key member fitted in both the first keyway and the second keyway. Accordingly, by fitting the key member in the first keyway and the second keyway, the first inner ring can be reliably positioned in the circumferential directions.

In the speed reducer, the first keyway extends in the axial directions in a portion of the outer circumferential surface of the input shaft in the circumferential directions. The second keyway may be located at a position facing the first keyway. The key member may have a rod shape extending in the axial directions. Accordingly, the first inner ring can be more reliably positioned in the circumferential directions with a relatively simple structure.

In the speed reducer, at least an end portion of the first inner ring on one side in the axial directions may include a flange projecting radially outward. In this manner, in a case where needle rollers included in a needle cage constituted by the needle rollers and a retainer retaining the needle rollers roll on the outer peripheral surface of the first inner ring as a raceway surface, movement of the case included in the needle cage in the axial directions is restricted by using the flange. As a result, more stable operation of the speed reducer can be ensured.

In the speed reducer, the input unit may further include a guide ring that is provided separately from the input shaft and the first inner ring, has a disc shape, is located at least on one side of the first inner ring in the axial directions, and projects radially outward relative to a raceway surface of the first inner ring. With this configuration, movement of the retainer included in the needle cage in the axial directions can also be restricted by the guide ring. As a result, more stable operation of the speed reducer can be ensured. Similarly, a material for the guide ring included in the input unit can be selected independently of materials for other components, and may be a resin such as PEEK containing fibers or a light metal such as aluminum, for example.

In the speed reducer, the first bearing may include a pair of first bearings arranged in the axial directions. The first inner ring may include a pair of first inner rings included in the pair of first bearings, and the pair of first inner rings may be arranged with a 180-degree phase shift in the circumferential directions. With this configuration, influence of the eccentric first inner ring during rotation of the input shaft is reduced so that more stable rotation of the input shaft can be thereby ensured.

In the speed reducer, the first inner ring may be fixed to the input shaft by interference fitting. This configuration can also restrict movement of the first inner ring relative to the input in the axial directions.

SPECIFIC EXAMPLES OF EMBODIMENT

Next, examples of specific embodiments of a speed reducer according to the present disclosure will be described with reference to the drawings. In the following drawings, the same or corresponding parts are denoted by the same reference numerals, and the description thereof will not be repeated.

First Embodiment

Figure 2:
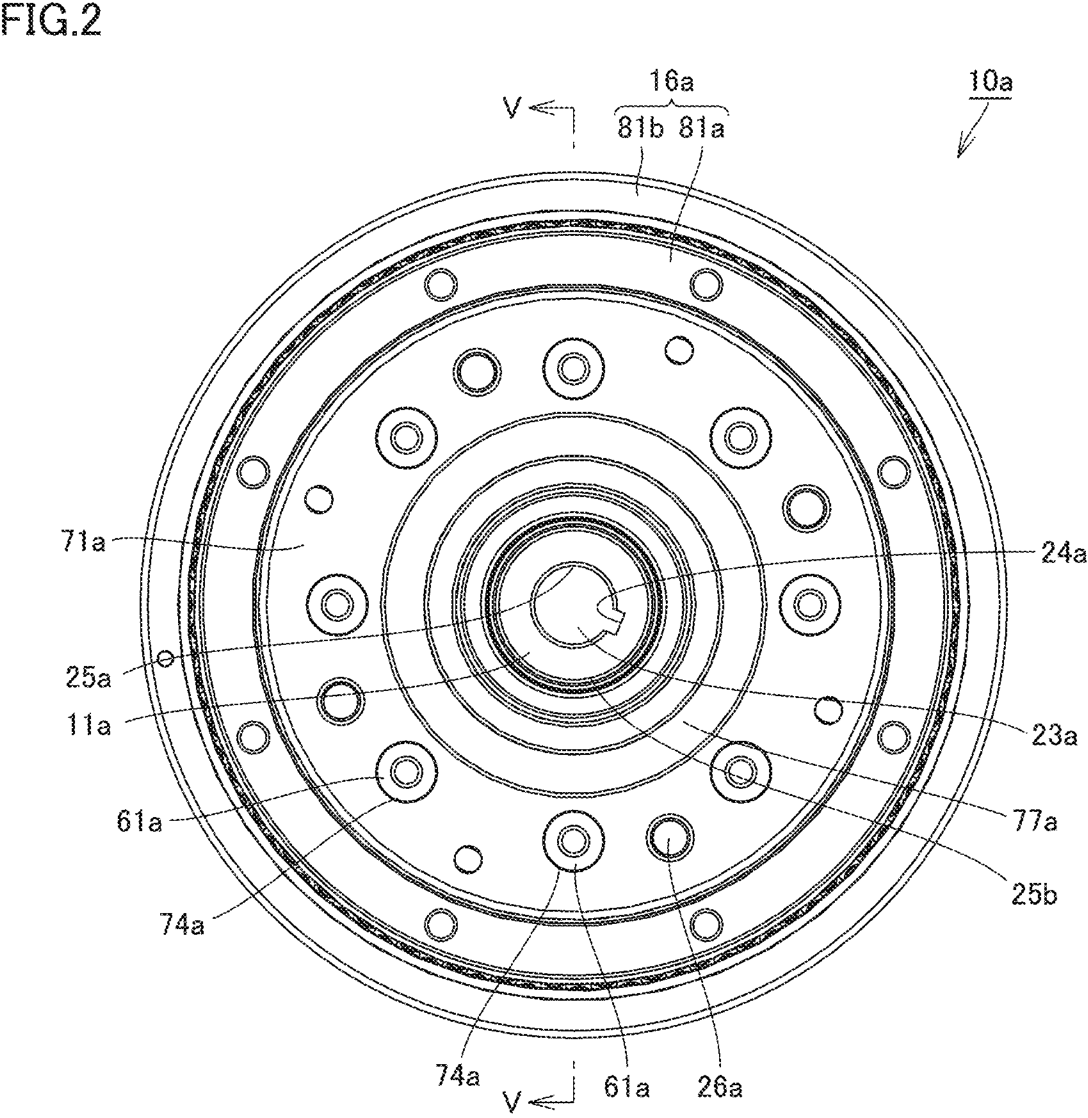
FIG. 2 is a schematic front view of the speed reducer shown in FIG. 1.
Figure 3:
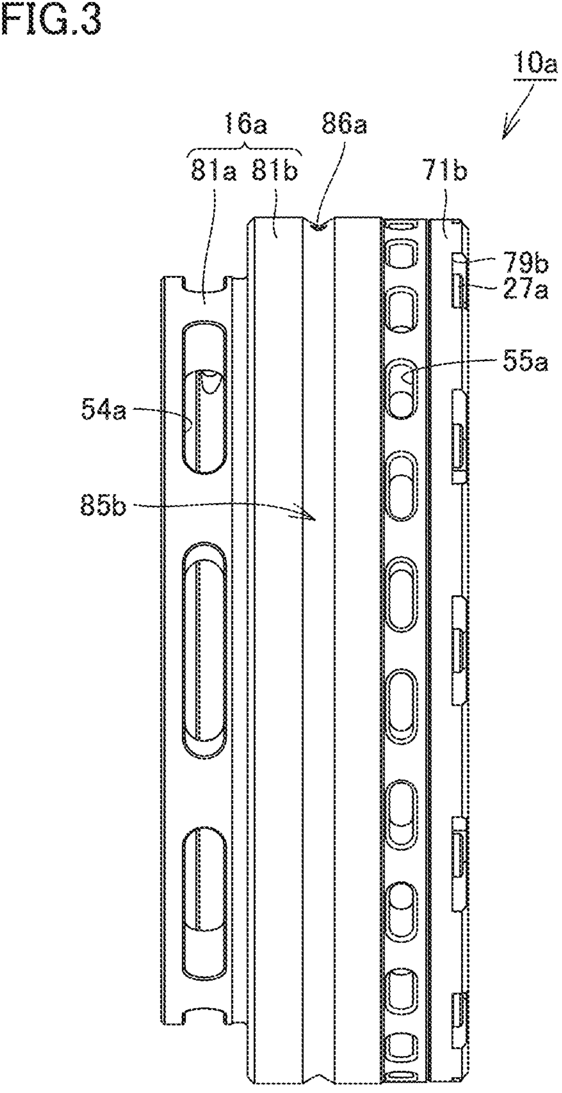
FIG. 3 is a schematic side view of the speed reducer shown in FIG. 1.
Figure 4:
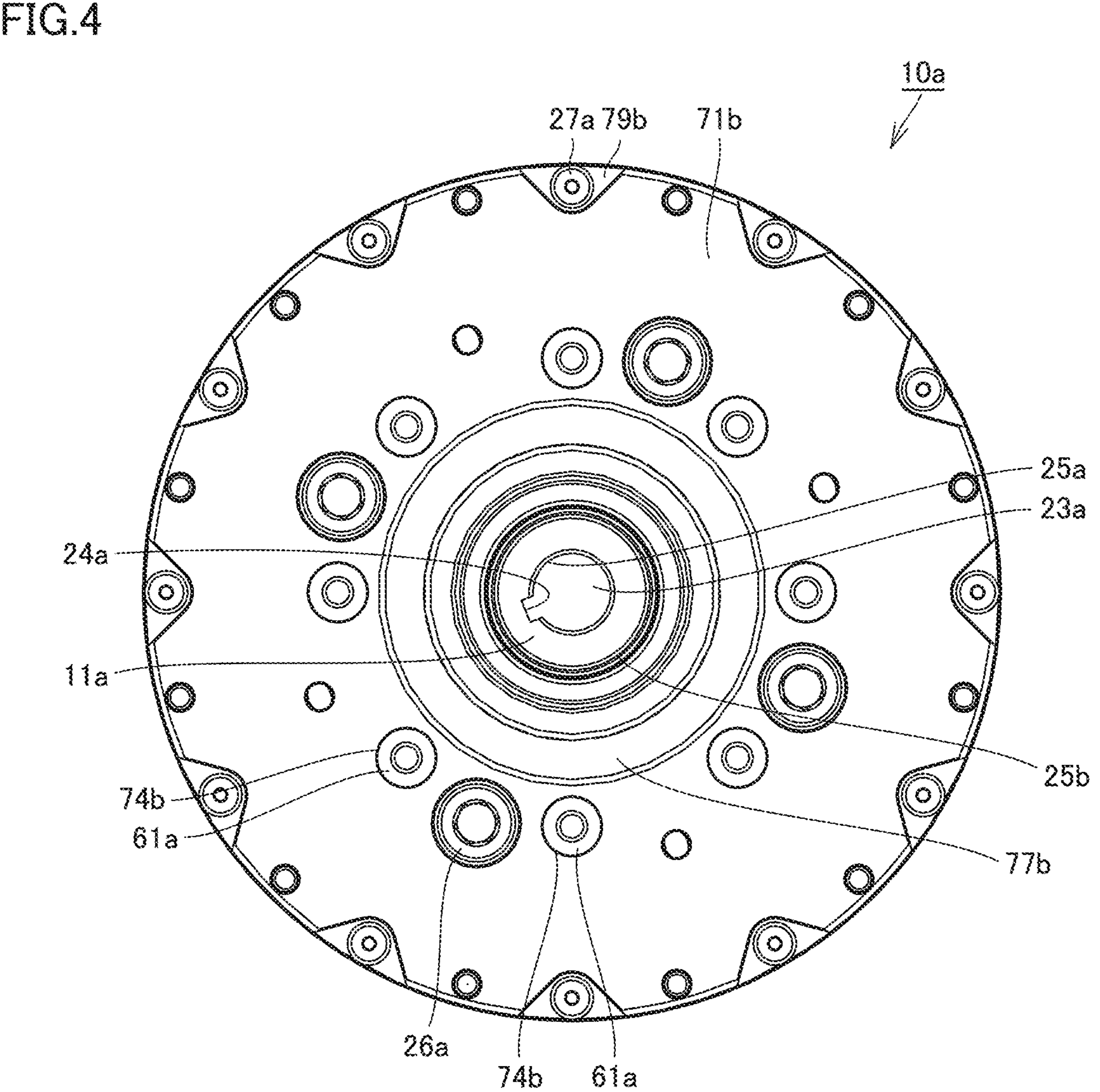
FIG. 4 is a schematic rear view of the speed reducer shown in FIG. 1.
Figure 5:
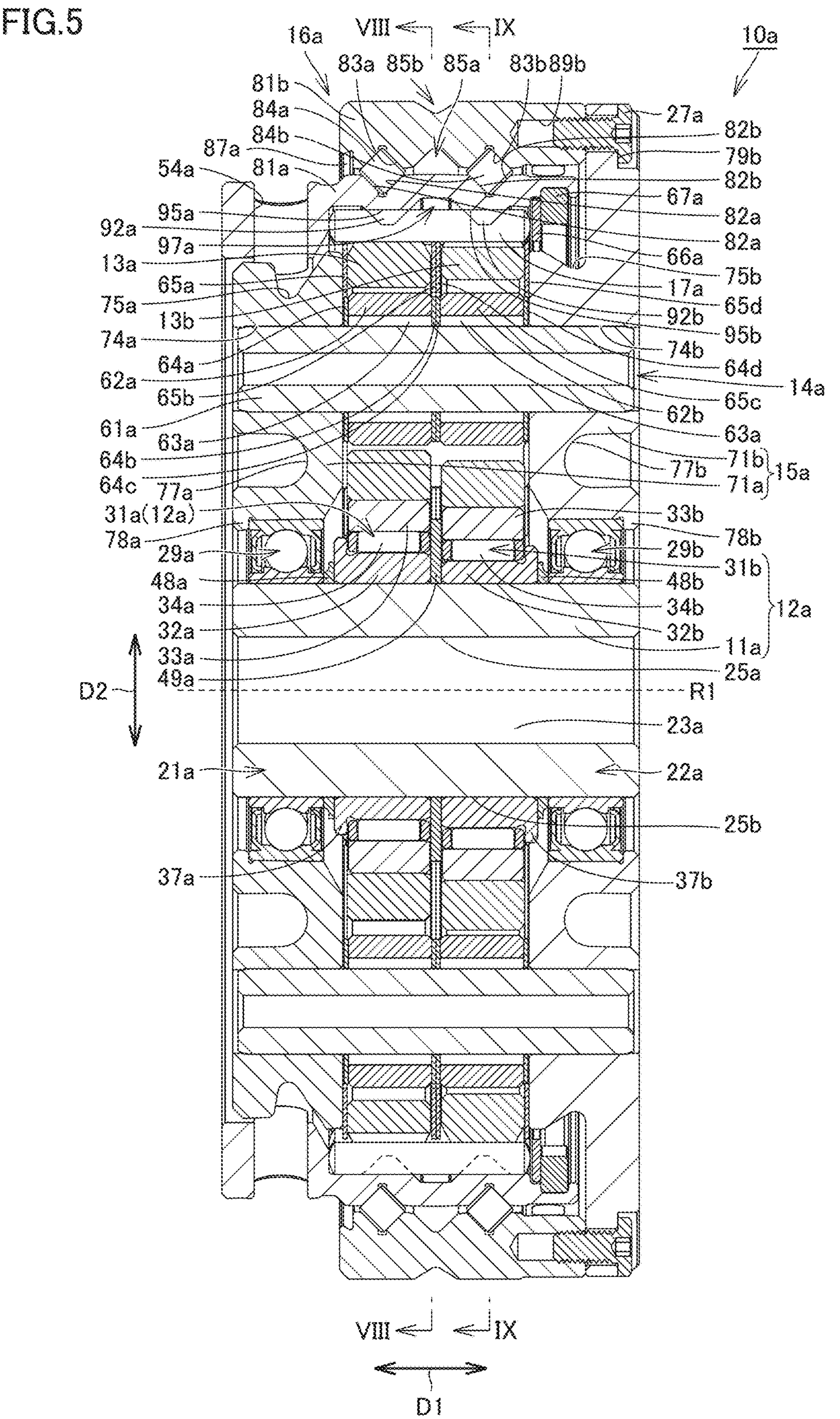
FIG. 5 is a schematic cross-sectional view taken along line V-V in FIG. 2.
Figure 6:
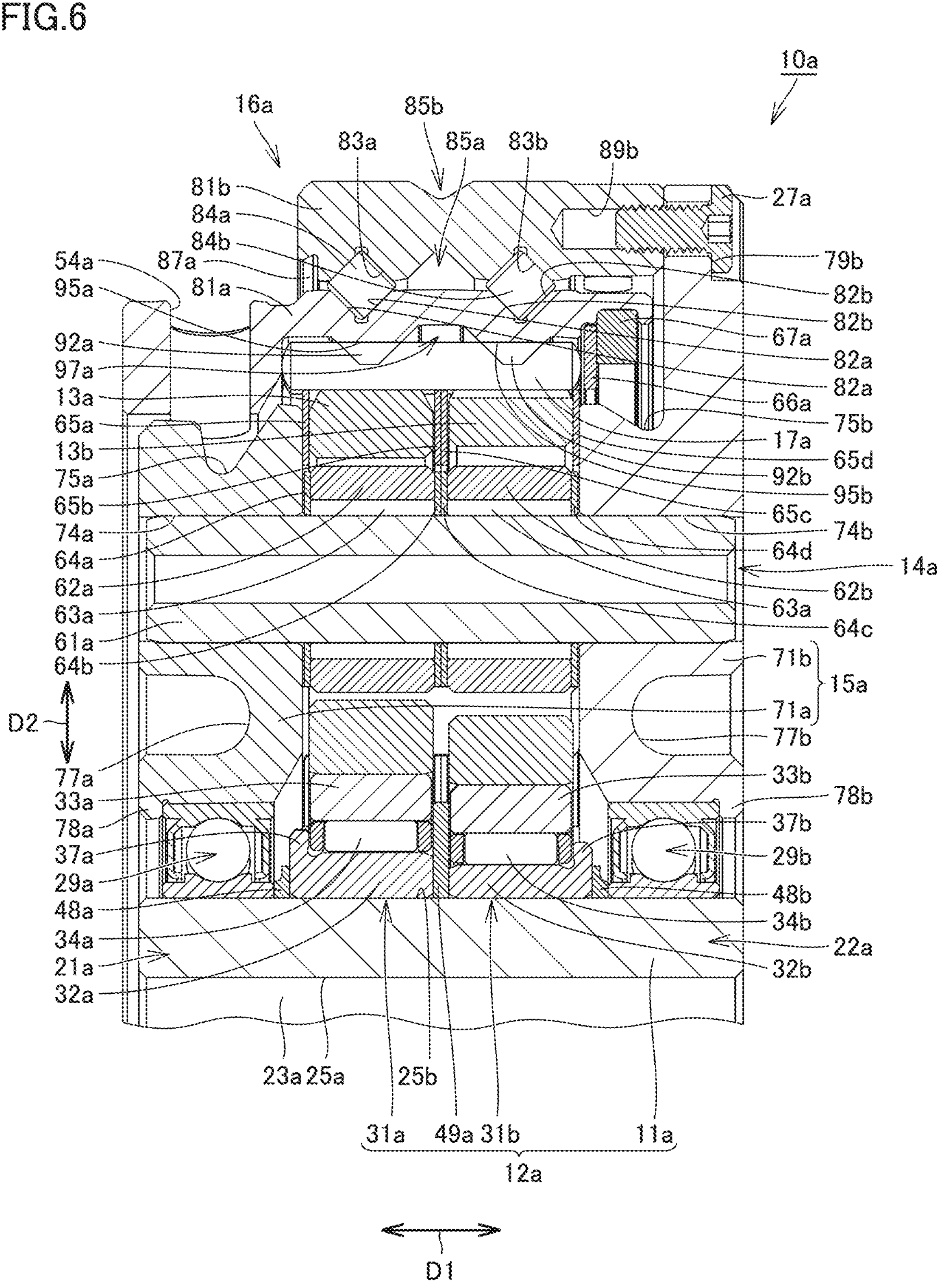
FIG. 6 is an enlarged view of a portion of the cross section of the speed reducer shown in FIG. 5.
Figure 7:
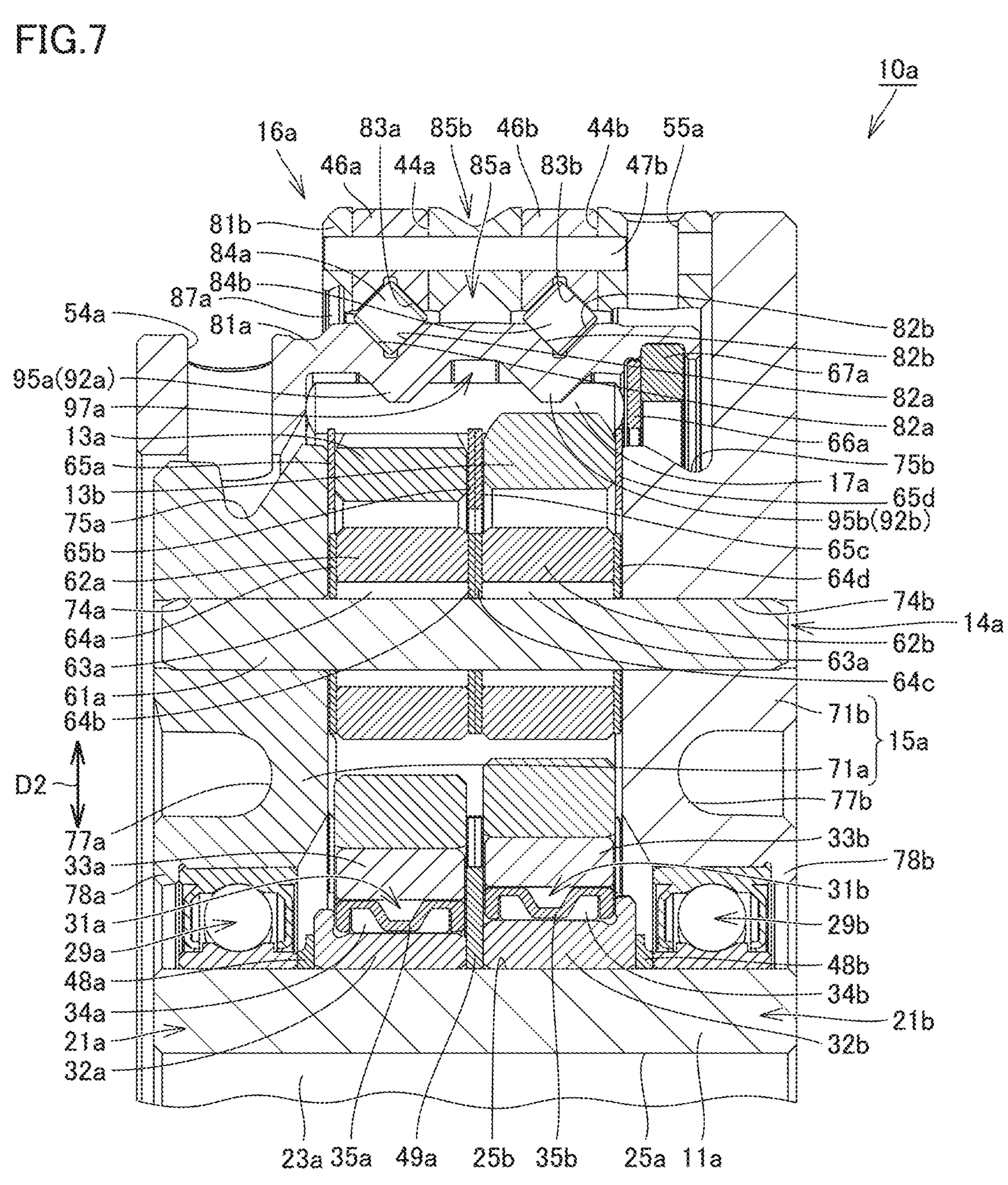
FIG. 7 is an enlarged view of a portion of the cross section of the speed reducer shown in FIG. 5.
Figure 8:
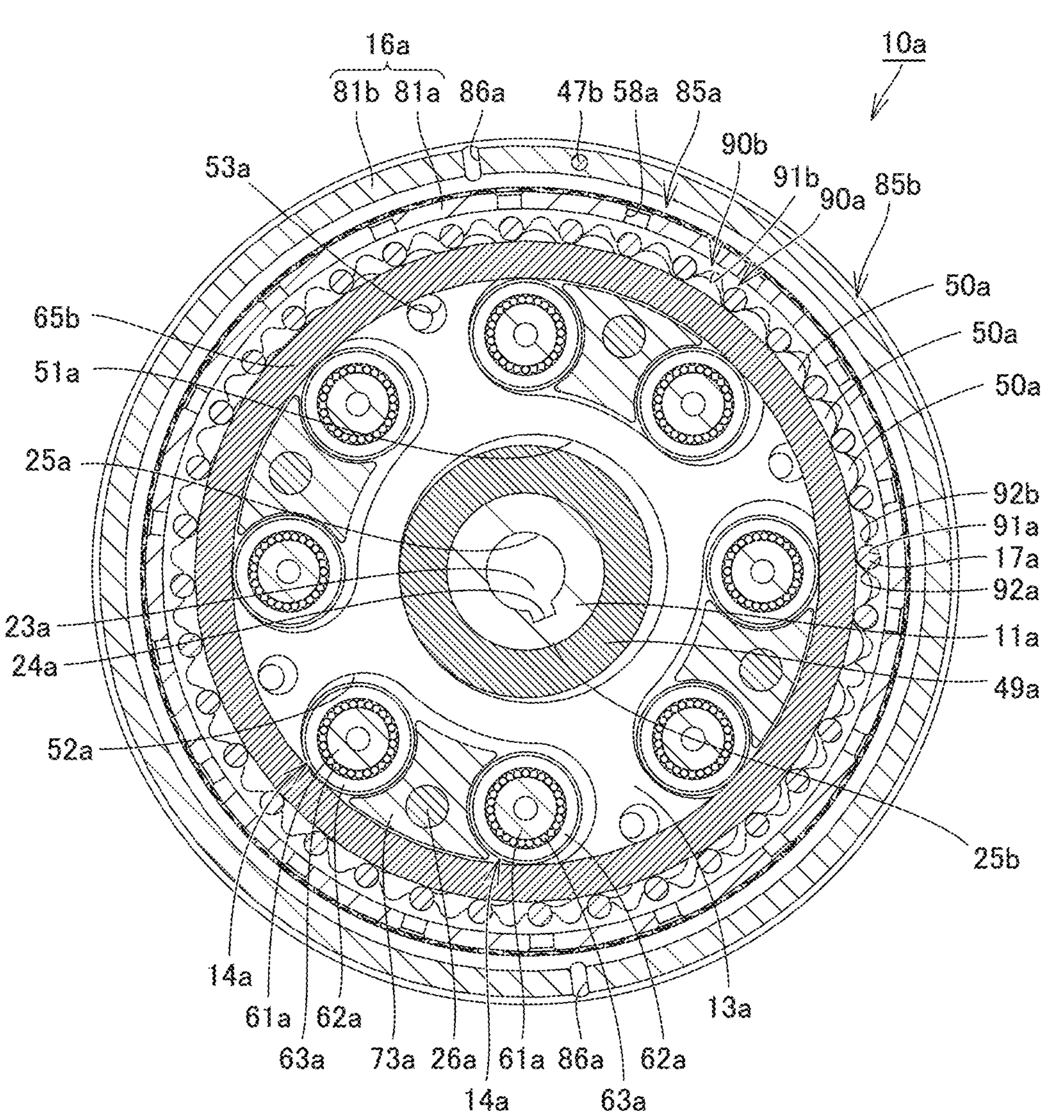
FIG. 8 is a schematic cross-sectional view taken along line VIII-VIII in FIG. 5.
Figure 9:
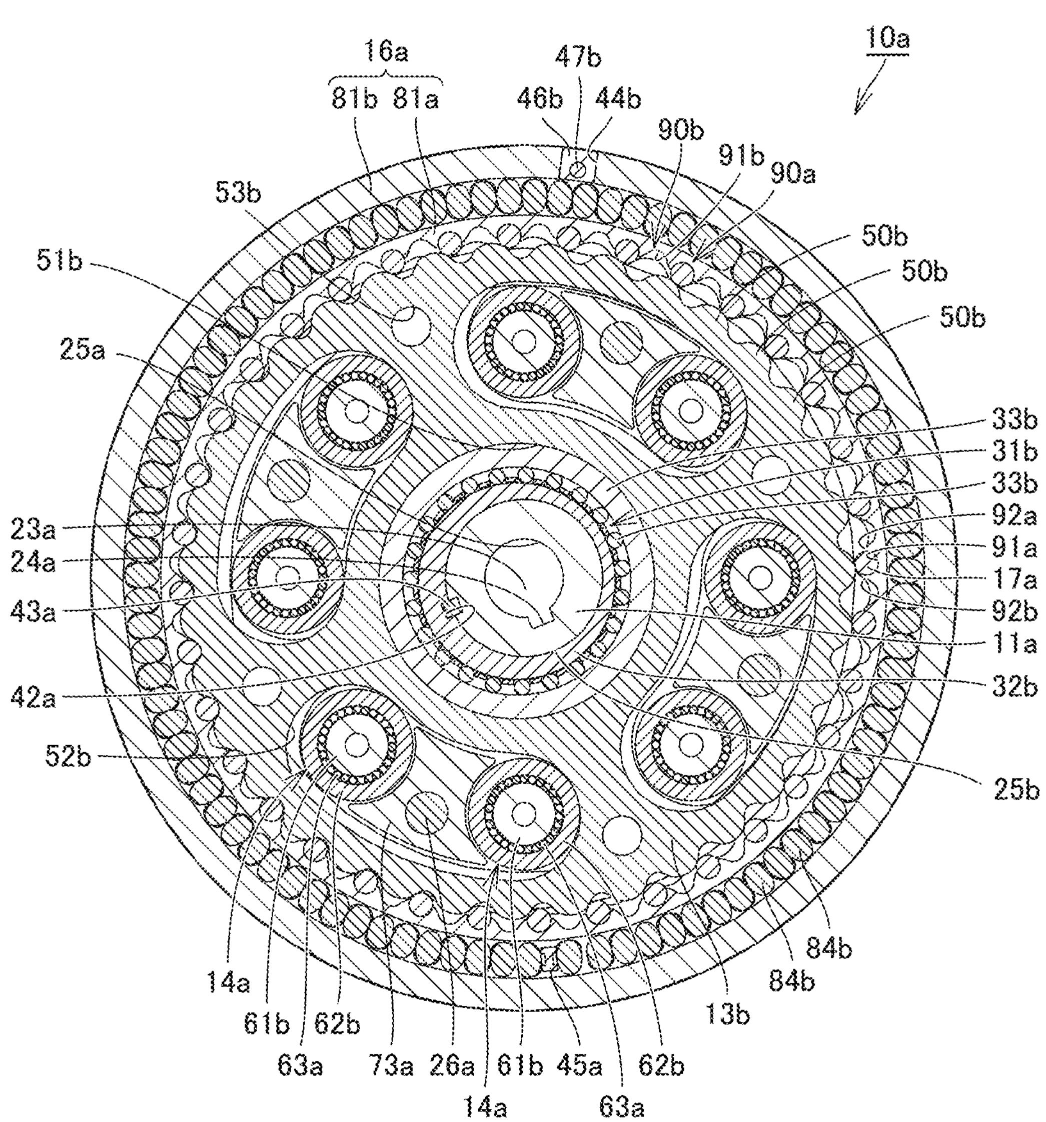
FIG. 9 is a schematic cross-sectional view taken along line IX-IX in FIG. 5.

First, a first embodiment, which is an embodiment of the present disclosure, will be described. FIG. 1 is a schematic perspective view illustrating a speed reducer according to the first embodiment of the present disclosure. FIG. 2 is a schematic front view of the speed reducer shown in FIG. 1. FIG. 3 is a schematic side view of the speed reducer shown in FIG. 1. FIG. 4 is a schematic rear view of the speed reducer shown in FIG. 1. FIG. 5 is a schematic cross-sectional view taken along line V-V in FIG. 2. FIGS. 6 and 7 are enlarged views illustrating a portion of the cross section of the speed reducer shown in FIG. 5. FIG. 6 is a cross-sectional view taken in a plane along circumferential directions excluding a lid described later. FIG. 7 is a cross-sectional view taken in a plane along the circumferential directions including the lid described later. FIG. 8 is a schematic cross-sectional view taken along line VIII-VIII in FIG. 5. FIG. 9 is a schematic cross-sectional view taken along line IX-IX in FIG. 5. In FIG. 5, for example, arrow D1 represents axial directions and arrow D2 represents radial directions. Broken line R1 represents a rotation center axis of a speed reducer 10*a*.

With reference to FIGS. 1 through 9, the speed reducer 10*a* according to the first embodiment of the present disclosure reduces a rotation speed of an input shaft 11*a* that is rotating at high speed, and outputs the reduced rotation speed from an output shaft described later. In this embodiment, the deceleration rate is 1/36. That is, when the rotation speed of the input shaft is 3000 revolutions per minute (rpm), the rotation speed of the output shaft is about 83.3 rpm. The deceleration rate is, of course, set at any value as required depending on the number of teeth of cycloid gears, the number of outer pins, the degree of eccentricity of a first inner ring, and so forth.

The speed reducer 10*a* includes: an input unit 12*a* including an input shaft 11*a* and first bearings 31*a* and 31*b* respectively including eccentric first inner rings 32*a* and 32*b* that rotate together with the input shaft 11*a*; cycloid gears 13*a* and 13*b*; a plurality of inner pins 14*a*; an inner pin holder 15*a*; a second bearing 16*a* including a second inner ring 81*a* and a second outer ring 81*b*; and a plurality of outer pins 17*a*. The first bearings 31*a* and 31*b* are disposed as a pair in the axial directions, and the cycloid gears 13*a* and 13*b* are disposed as a pair in the axial directions. The components will be described below.

The input shaft 11*a* has a hollow cylindrical shape. Specifically, the input shaft 11*a* has an axial through hole 23*a* penetrating the input shaft 11*a* in the axial directions from a first axial end 21*a* that is one end in the axial directions to a second axial end 21*b* that is the other end in the axial directions. An inner peripheral surface 25*a* of the input shaft 11*a* constituting the axial through hole 23*a* has an axial inner peripheral surface keyway 24*a*. In the axial inner peripheral surface keyway 24*a*, a portion of the inner peripheral surface 25*a* in the circumferential directions is recessed radially outward. The use of this axial inner peripheral surface keyway 24*a* reduces a slip of the input shaft 11*a* relative to the rotation axis in the rotation directions when a rotation shaft (not shown) of a motor is coupled to the input shaft 11*a*. An outer peripheral surface 25*b* of the input shaft 11*a* extends straight in the axial directions. The inner peripheral surface 25*a* of the input shaft 11*a* extends straight in the axial directions except for a region where the axial inner peripheral surface keyway 24*a* is present. This input shaft 11*a* has a relatively simple structure, and thus, costs can be reduced. The input shaft 11*a* may have a solid cylindrical shape when necessary.

The input shaft 11*a* may be made of, for example, a metal. In this embodiment, aluminum is employed as a material for the input shaft 11*a*. The material for the input shaft 11*a* only needs to be a material that can receive a torque of the motor, and may be a resin, for example.

A first input shaft bearing 29*a* and a second input shaft bearing 29*b* that are two bearings supporting the input shaft 11*a* are attached to the input shaft 11*a*. The first input shaft bearing 29*a* is attached to the first axial end 21*a*, and the second input shaft bearing 29*b* is attached to the second axial end 21*b*. The first input shaft bearing 29*a* and the second input shaft bearing 29*b* are spaced in the axial directions. An inner ring of the first input shaft bearing 29*a* and an inner ring of the second input shaft bearing 29*b* are both fixed to the input shaft 11*a*. An outer ring of the first input shaft bearing 29*a* and an outer ring of the second input shaft bearing 29*b* are both fixed to an inner pin holder 15*a* described later and serving as a fixing portion. The first input shaft bearing 29*a* and the second input shaft bearing 29*b* are, for example, deep groove ball bearings. The input shaft 11*a* is rotatably supported by these first input shaft bearing 29*a* and second input shaft bearing 29*b*. The first input shaft bearing 29*a* is in contact with a step 78*a* of a first holder portion 71*a* included in the inner pin holder 15*a* described later in the axial directions to thereby restrict movement in the axial directions. The second input shaft bearing 29*b* is in contact with a step 78*b* of a second holder portion 71*b* included in the inner pin holder 15*a* described later to thereby restrict movement in the axial directions.

Figure 10:
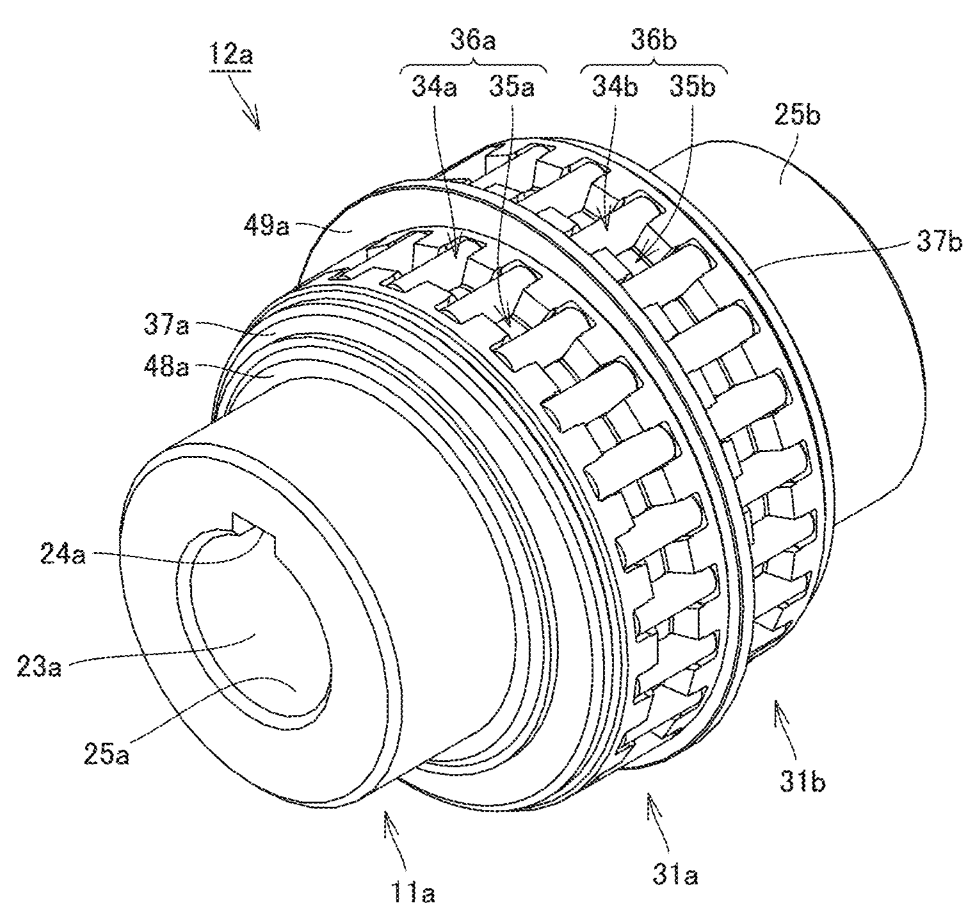
FIG. 10 is a schematic perspective view illustrating a portion of an input unit included in the speed reducer.
Figure 11:
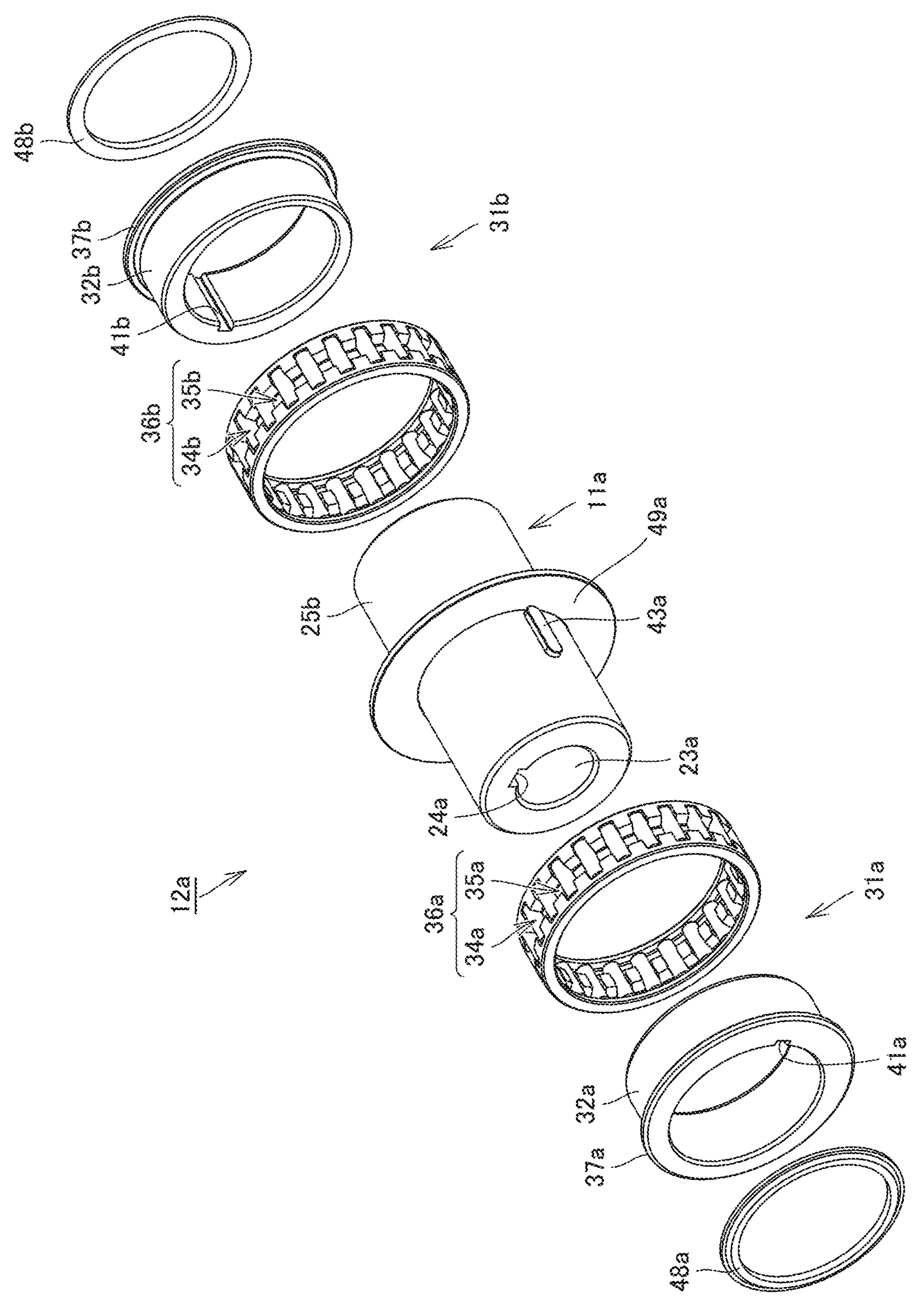
FIG. 11 is a disassembled perspective view illustrating a portion of the input unit shown in FIG. 10.
Figure 12:
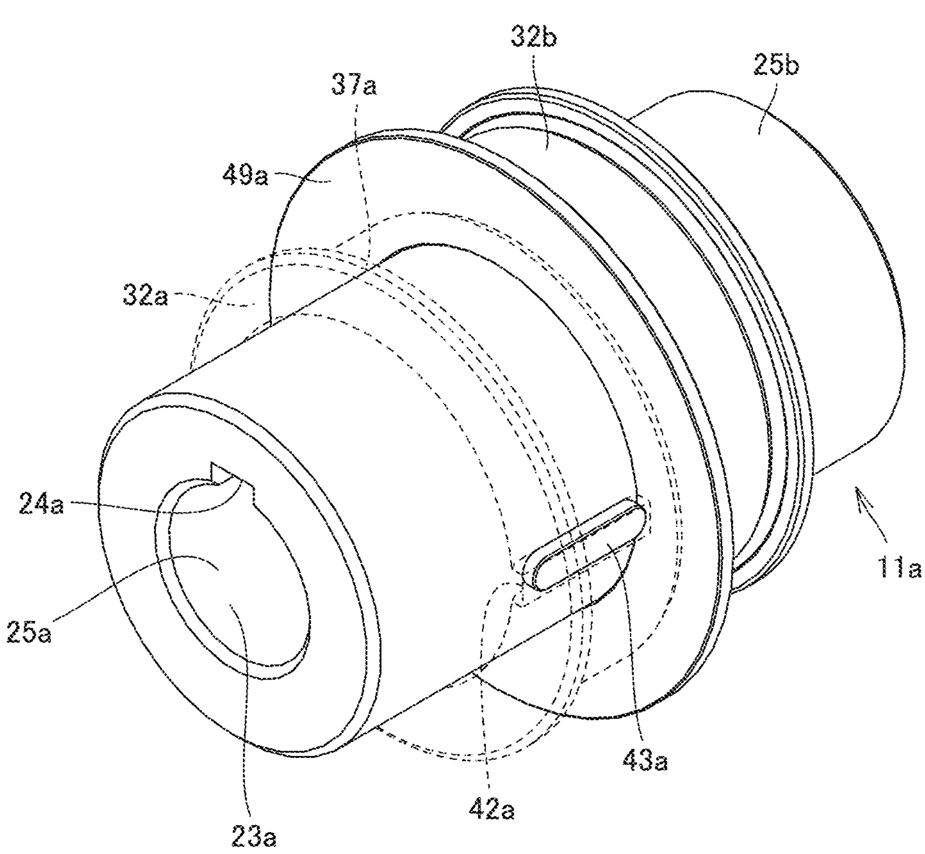
FIG. 12 is a schematic perspective view in which a portion of the input unit shown in FIG. 10 is partially omitted and indicated by broken lines.
Figure 13:
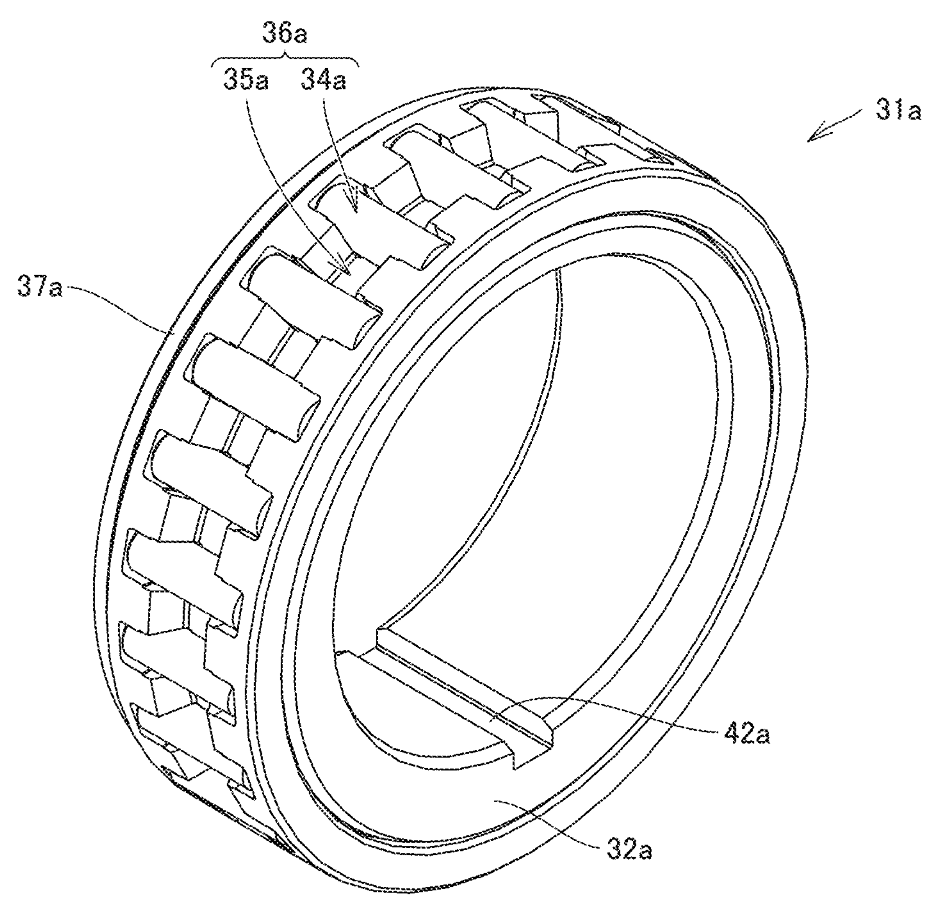
FIG. 13 is a schematic perspective view illustrating a portion of a first bearing included in the input unit.
Figure 14:
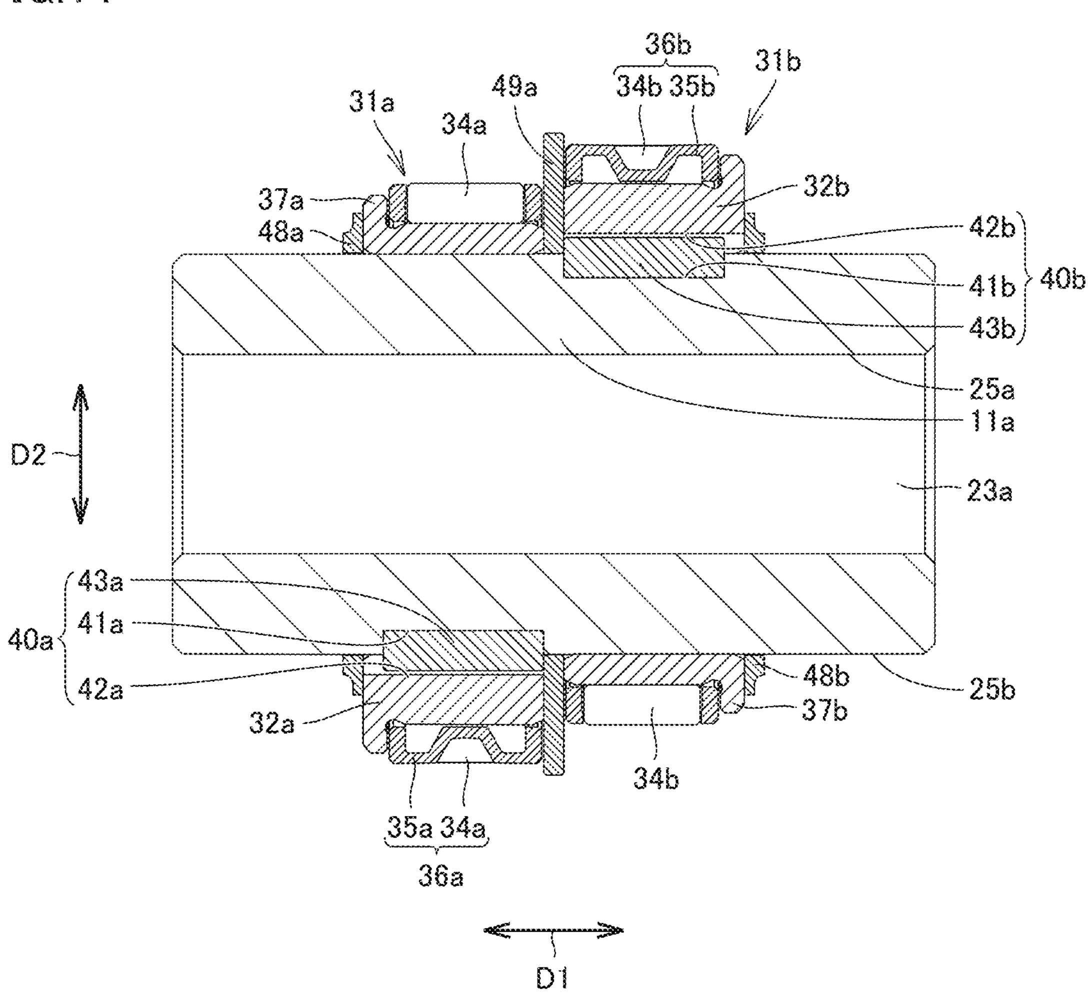
FIG. 14 is a schematic cross-sectional view illustrating a portion of the input unit shown in FIG. 10.
Figure 15:
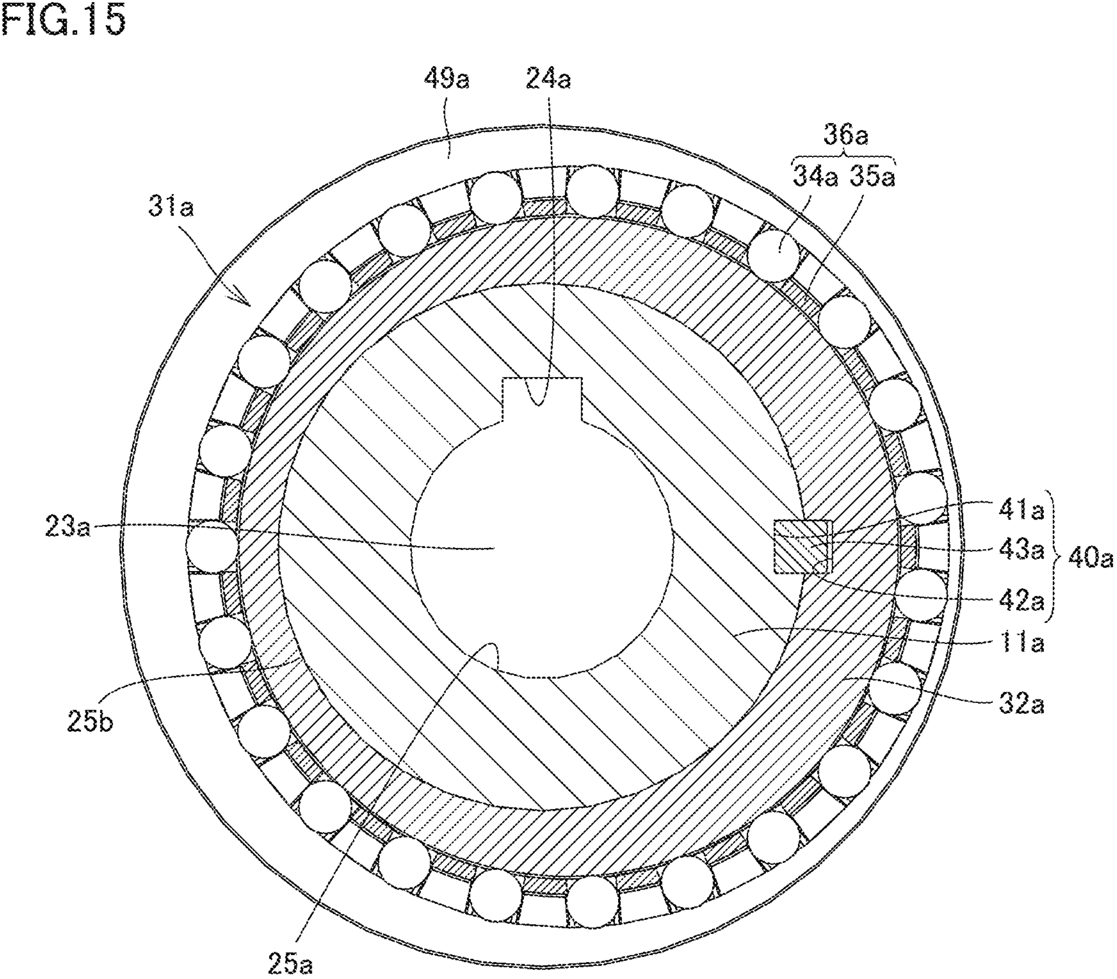
FIG. 15 is a schematic cross-sectional view illustrating a portion of the input unit shown in FIG. 10.

Next, a detailed configuration of the input unit 12*a* will be described. FIG. 10 is a schematic perspective view illustrating a portion of the input unit 12*a* included in the speed reducer 10*a*. FIG. 11 is a disassembled perspective view illustrating a portion of the input unit 12*a* shown in FIG. 10. FIG. 12 is a schematic perspective view in which a portion of the input unit 12*a* shown in FIG. 10 is omitted and indicated by broken lines. FIG. 13 is a schematic perspective view illustrating a portion of the first bearing 31*a* included in the input unit 12*a*. FIG. 14 is a schematic cross-sectional view illustrating a portion of the input unit 12*a* shown in FIG. 10. FIG. 14 is a cross-sectional view taken in a plane including a rotation center axis of the first bearing 31*a*. FIG. 15 is a schematic cross-sectional view illustrating a portion of the input unit 12*a* shown in FIG. 10. FIG. 15 is a cross-sectional view taken in a plane including the first bearing 31*a* and perpendicular to the axial directions.

With reference to FIGS. 10 through 15, the input unit 12*a* includes the input shaft 11*a*, the first bearing 31*a*, and the first bearing 31*b*, as described above. The first bearing 31*a* includes the eccentric first inner ring 32*a* that rotates together with the input shaft 11*a*, the first outer ring 33*a* located radially outward of the first inner ring 32*a*, and a needle cage 36*a*. The needle cage 36*a* is constituted by needle rollers 34*a* as a plurality of rolling bodies located between the first inner ring 32*a* and the first outer ring 33*a* in the radial directions, and a retainer 35*a* retaining the needle rollers 34*a*. The needle rollers 34*a* included in the needle cage 36*a* constituted by the needle rollers 34*a* and the retainer 35*a* retaining the needle rollers 34*a* roll on the outer peripheral surface of the first inner ring 32*a* as a raceway surface. The first bearing 31*b* includes the eccentric first inner ring 32*b* that rotates together with the input shaft 11*a*, the first outer ring 33*b* located radially outward of the first inner ring 32*b*, and a needle cage 36*b*. The needle cage 36*b* is constituted by needle rollers 34*b* as a plurality of rolling bodies located between the first inner ring 32*b* and the first outer ring 33*b* in the radial directions, and a retainer 35*b* retaining the needle rollers 34*b*. The needle rollers 34*b* included in the needle cage 36*b* constituted by the needle rollers 34*b* and the retainer 35*b* retaining the needle rollers 34*b* roll on the outer peripheral surface of the first inner ring 32*b* as a raceway surface. The first inner rings 32*a* and 32*b* are fixed to the input shaft 11*a* by interference fit. The first bearings 31*a* and 31*b* are located between the first input shaft bearing 29*a* and the second input shaft bearing 29*b* in the axial directions. The first input shaft bearing 29*a* and the first bearing 31*a* are adjacent to each other in the axial directions, and the second input shaft bearing 29*b* and the first bearing 31*b* are adjacent to each other in the axial directions.

In the speed reducer 10*a* of the present disclosure, the first inner ring 32*a* included in the first bearing 31*a* and the first inner ring 32*b* included in the first bearing 31*b* are each provided separately from the input shaft 11*a*. The input unit 12*a* includes movement restrictors 40*a* and 40*b* that restrict movement of the first inner rings 32*a* and 32*b* relative to the input shaft 11*a*. The movement restrictors 40*a* and 40*b* included in the input unit 12*a* include first keyways 41*a* and 41*b*, second keyways 42*a* and 42*b*, and key members 43*a* and 43*b*. Each of the first keyways 41*a* and 41*b* is recessed from the outer peripheral surface 25*b* of the input shaft 11*a*. In this embodiment, each of the first keyways 41*a* and 41*b* extends in the axial directions in a portion of the outer peripheral surface 25*b* of the input shaft 11*a* in the circumferential directions. The first keyways 41*a* and 41*b* are located at different positions in the axial directions and the circumferential directions. Specifically, in the axial directions, the first keyway 41*a* is located between the position at which a guide ring 49*a* is placed and the first axial end 21*a*, and the first keyway 41*b* is located between the position at which the guide ring 49*a* is placed and the second axial end 21*b*. In the circumferential directions, the first keyway 41*a* is located at a position that is rotated 180 degrees from the first keyway 41*b*. Each of the first keyways 41*a* and 41*b* is located at a position that is rotated 90 degrees from the position at which the axial inner peripheral surface keyway 24*a* is located in the circumferential directions.

The second keyways 42*a* and 42*b* is recessed from the inner peripheral surfaces of the first inner rings 32*a* and 32*b*, respectively. In this embodiment, the second keyways 42*a* and 42*b* penetrate portions of the first inner rings 32*a* and 32*b*, respectively, in the circumferential directions to form groove shapes in the axial directions. The second keyways 42*a* and 42*b* are located in regions of the first inner rings 32*a* and 32*b* each having largest eccentricity in the circumferential directions. The second keyways 42*a* and 42*b* are located at positions corresponding to the first keyways 41*a* and 41*b* when the first inner rings 32*a* and 32*b* are attached to the input shaft 11*a* such that the inner peripheral surfaces of the first inner rings 32*a* and 32*b* face the outer peripheral surface of the input shaft 11*a*.

Each of the key members 43*a* and 43*b* has a rod shape with a rectangular cross section. The key members 43*a* and 43*b* are fitted in spaces defined by the first keyways 41*a* and 41*b* and the second keyways 42*a* and 42*b* when the second keyways 42*a* and 42*b* are located to face the respective first keyways 41*a* and 41*b*. That is, the key members 43*a* and 43*b* are shaped to be fitted in the first keyways 41*a* and 41*b* and the second keyways 42*a* and 42*b*, respectively. Corners of end portions of the key members 43*a* and 43*b* are rounded.

Axial end portions of the first inner rings 32*a* and 32*b* include flanges 37*a* and 37*b* extending radially outward. The input unit 12*a* has a disc shape, and includes the guide ring 49*a* located on one side of the first inner rings 32*a* and 32*b* in the axial directions and projecting radially outward relative to the raceway surface of the first inner ring 32*a*. The guide ring 49*a* is located on the other side of the first inner rings 32*a* and 32*b* in the axial directions. That is, the first bearing 31*a* and the first bearing 31*b* sandwich the guide ring 49*a* in the axial directions. The flange 37*a* is located at one end of the raceway surface of the first inner ring 32*a* in the axial directions, and the guide ring 49*a* is located at the other end of the raceway surface of the first inner ring 32*a* in the axial directions. A ring-shaped collar 48*a* for adjusting a gap in the axial directions formed in attaching the first inner ring 32*a* is located on one side of the first inner ring 32*a* in the axial directions. The flange 37*b* is located at one end of the raceway surface of the first inner ring 32*b* in the axial directions, and the guide ring 49*a* is located at the other end of the raceway surface of the first inner ring 32*b* in the axial directions. A ring-shaped collar 48*b* for adjusting a gap in the axial directions formed in attaching the first inner ring 32*b* is located on one side of the first inner ring 32*b* in the axial directions. The guide ring 49*a* is made of a metal in this embodiment, and may be subjected to heat treatment and grinding finish. Specifically, the guide ring 49*a* is made of duralumin, and may be anodized or subjected to other treatments.

Next, assembly of the input unit 12*a* will be described briefly. First, the input shaft 11*a* is prepared. Then, the guide ring 49*a* is fitted onto the input shaft 11*a* from one side in the axial directions, and then, the key members 43*a* and 43*b* are fitted in the first keyways 41*a* and 41*b*, respectively. The guide ring 49*a* is sandwiched between axial ends of the two opposed key members 43*a* and 43*b* to be fixed in the axial directions. In this manner, the guide ring 49*a* is positioned in the axial directions. Then, the first inner ring 32*a* to which the needle cage 36*a* is attached on the radially outer side from the side where the flange 37*a* is not located, is fitted onto the input shaft 11*a* from one side in the axial directions. At this time, the first inner ring 32*a* is fitted such that the circumferential position of the second keyway 42*a* coincides with the position of the key member 43*a*. Then, the first inner ring 32*a* is pushed along the axial directions such that the end surface of the first inner ring 32*a* where the flange 37*a* is not located contacts the guide ring 49*a*. In this manner, the first inner ring 32*a* is fitted onto the input shaft 11*a*. The retainer 35*a* of the needle cage 36*a* is sandwiched between the guide ring 49*a* and the flange 37*a* of the first inner ring 32*a* to be restricted in the axial directions. Further, the first inner ring 32*b* to which the needle cage 36*b* is attached on the radially outer side from the side where the flange 37*b* is not located, is fitted onto the input shaft 11*a* from the other side in the axial directions. Then, the first inner ring 32*b* is pushed along the axial directions such that the end surface of the first inner ring 32*b* where the flange 37*b* is not located contacts the guide ring 49*a*. At this time, in a manner similar to the case of the first inner ring 32*a*, the first inner ring 32*b* is also fitted such that the circumferential position of the second keyway 42*b* coincides with the position of the key member 43*b*. The retainer 35*b* of the needle cage 36*b* is sandwiched between the guide ring 49*b* and the flange 37*b* of the first inner ring 32*b* to be restricted in the axial directions. In this manner, the first inner rings 32*a* and 32*b* are fitted onto the input shaft 11*a*. The fitting of the first inner rings 32*a* and 32*b* onto the input shaft 11*a* is interference fitting. Specifically, for example, the first inner rings 32*a* and 32*b* are press fitted onto the input shaft 11*a*, and are also assembled by shrink fitting. Thereafter, the collars 48*a* and 48*b* are fitted onto the input shaft 11*a* in the axial directions. In this manner, the input unit 12*a* is assembled.

Figure 16:
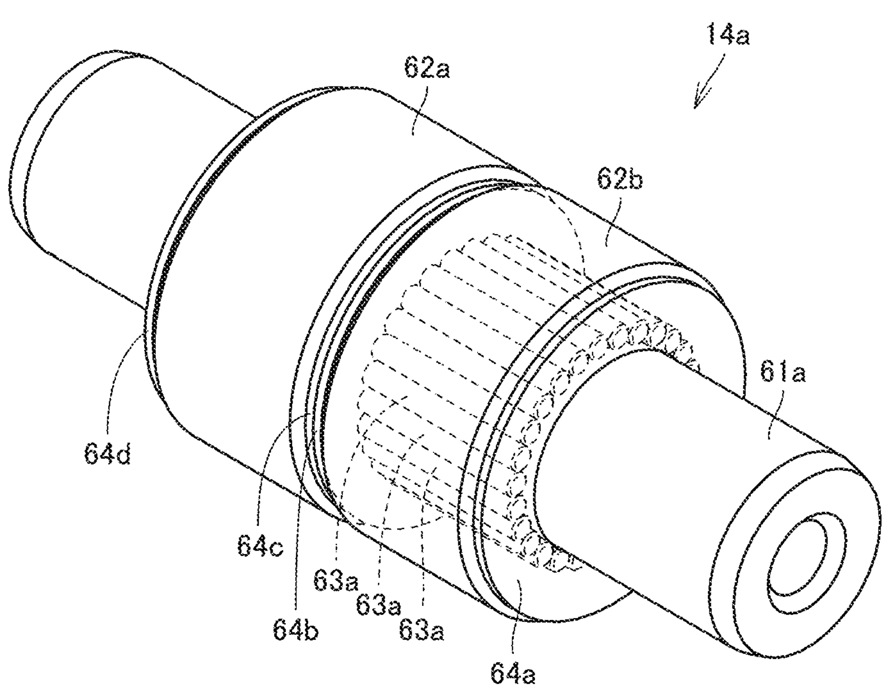
FIG. 16 is a schematic perspective view in which a portion of inner pins is indicated by broken lines.

A configuration of the inner pins 14*a* will now be described. FIG. 16 is a schematic perspective view in which a portion of the inner pins 14*a* is indicated by broken lines. With reference to FIG. 16, the inner pin 14*a* includes a hollow cylindrical shank 61*a*, two annular inner pin outer rings 62*a* and 62*b* each having an inner diameter larger than the outer diameter of the shank 61*a*, rollers 63*a* as a plurality of rolling bodies disposed between the outer peripheral surface of the shank 61*a* and the inner peripheral surfaces of the inner pin outer rings 62*a* and 62*b*, and a plurality of thrust washers 64*a*, 64*b*, 64*c*, and 64*d* arranged in the thrust directions. That is, the inner pin 14*a* is constituted as a rolling bearing using the plurality of rollers 63*a* as rolling bodies. The inner pin outer rings 62*a* and 62*b* are arranged in the axial directions while sandwiching the thrust washers 64*b* and 64*c* therebetween. Each of the thrust washers 64*a*, 64*b*, 64*c*, and 64*d* is made of a thermoplastic resin such as a polyetheretherketone (PEEK), but is not limited to this example. The inner pin 14*a* does not include a so-called retainer, and is of a full component roller type. The inner pin 14*a* may be a plain bearing. The inner pin 14*a* functions as a so-called planet shaft. In this embodiment, a total of eight inner pins 14*a* are provided.

Figure 17:
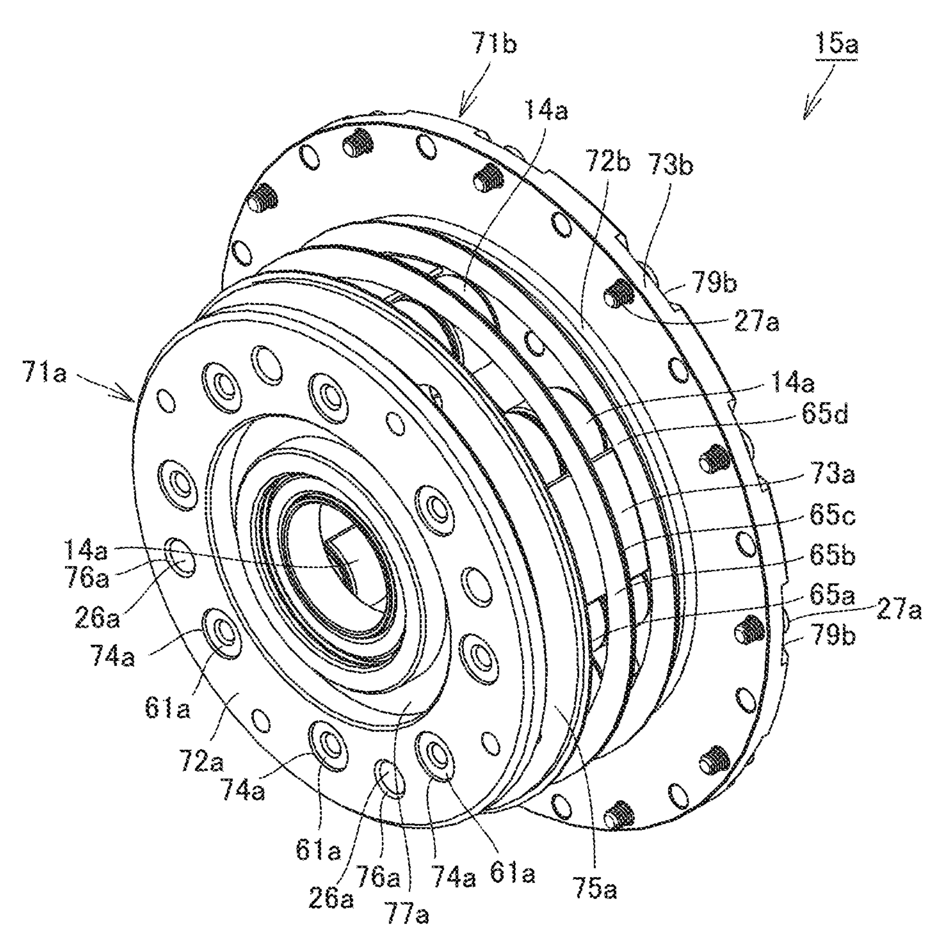
FIG. 17 is a schematic perspective view of an inner pin holder illustrating a state where inner pins are held by a combination of a first holder portion and a second holder portion.
Figure 18:
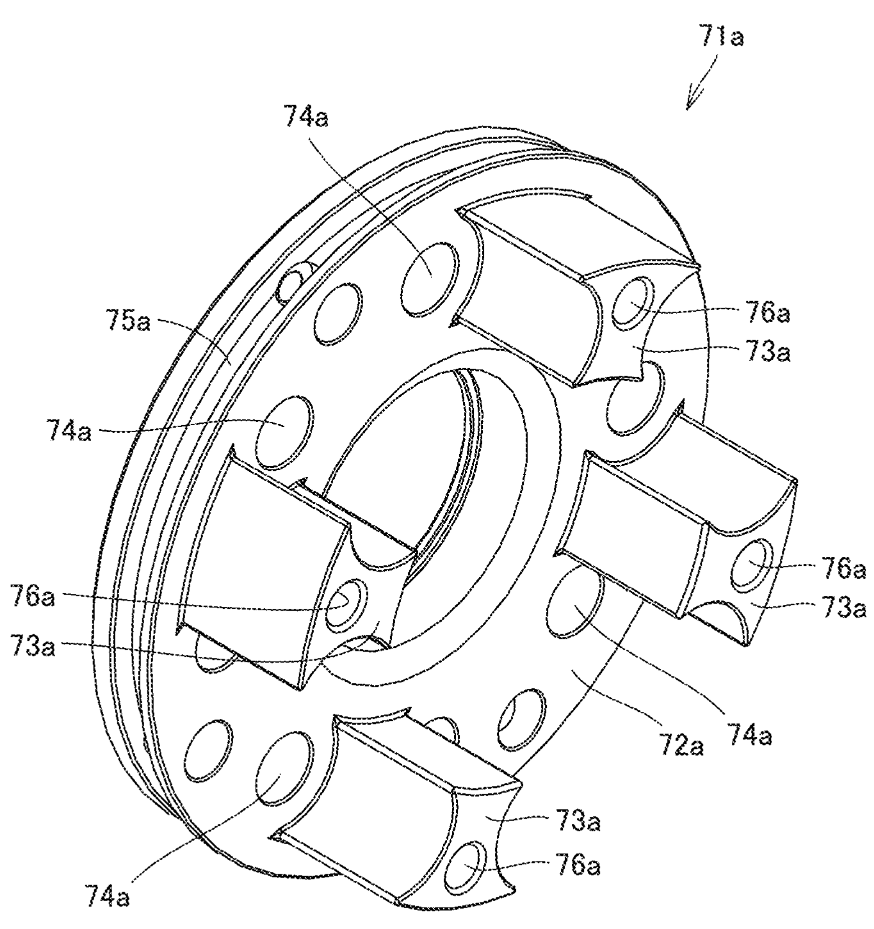
FIG. 18 is a schematic perspective view of the first holder portion.
Figure 19:
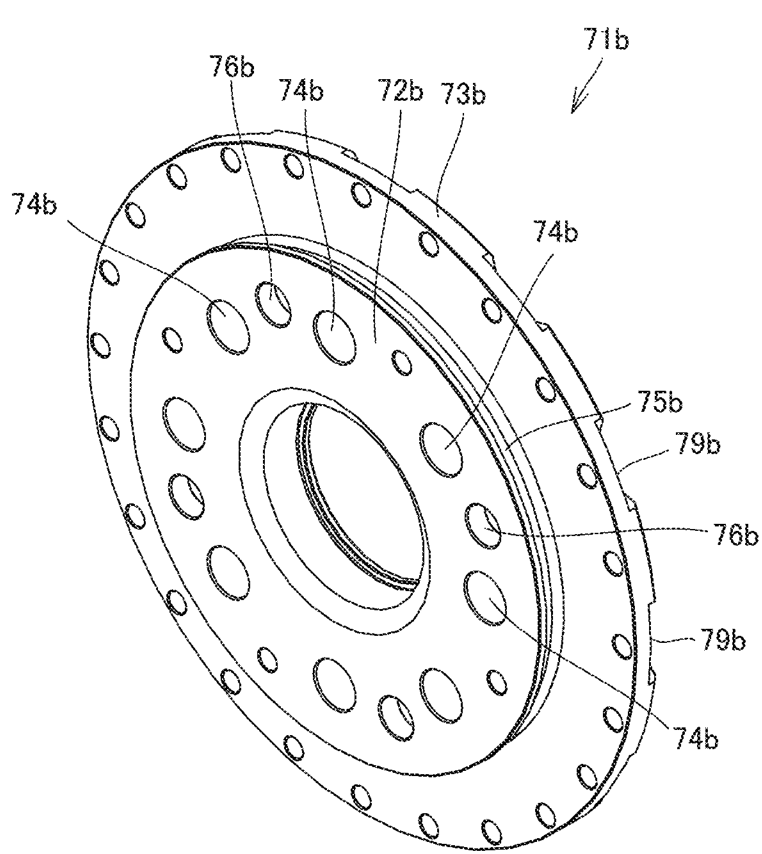
FIG. 19 is a schematic perspective view of the second holder portion.

Next, a configuration of the inner pin holder 15*a* will be described. The inner pin holder 15*a* includes the first holder portion 71*a* and the second holder portion 71*b*. The inner pin holder 15*a* supports the inner pins 14*a*, specifically, both ends of the shanks 61*a* included in the inner pins 14*a*. The inner pin holder 15*a* functions as a planet shaft supporter that supports planet shafts in a case where the shanks 61*a* of the inner pins 14*a* are the planet shafts. FIG. 17 is a schematic perspective view of the inner pin holder 15*a* illustrating a state where the inner pins 14*a* are held by a combination of the first holder portion 71*a* and the second holder portion 71*b*. FIG. 18 is a schematic perspective view of the first holder portion 71*a*. FIG. 19 is a schematic perspective view of the second holder portion 71*b*. FIG. 17 also shows the thrust washers 65*a*, 65*b*, 65*c*, and 65*d*.

With reference to FIGS. 17, 18, and 19, the first holder portion 71*a* includes a disc-shaped plate portion 72*a* in which a through hole penetrating the plate portion 72*a* in the thickness directions is located at the center in the radial directions, and a plurality of support columns 73*a* projecting along the thickness directions from one surface of the plate portion 72*a* on one side in the thickness directions. The plate portion 72*a* and the plurality of support columns 73*a* are integrated. In this embodiment, four support columns 73*a* are provided at 90-degree intervals. The plate portion 72*a* has a plurality of press-fitting holes 74*a* in which end portions of the shanks 61*a* of the inner pins 14*a* on one side can be press fitted, with intervals in the circumferential directions. The press-fitting holes 74*a* penetrate the plate portion 72*a* in the thickness directions, and a total of eight press-fitting holes 74*a* are provided, corresponding to the number of the inner pins 14*a*. From the viewpoint of weight reduction, the outer peripheral surface of the plate portion 72*a* has an annular recessed groove 75*a* that is recessed radially inward.

The support columns 73*a* connect the plate portion 72*a* of the first holder portion 71*a* to the second holder portion 71*b*. A total of four support columns 73*a* are provided. The support columns 73*a* are located within second through holes 52*a* and 52*b* of the cycloid gears 13*a* and 13*b* described later when assembled into the speed reducer 10*a*. End surfaces of the support columns 73*a* in the circumferential directions are recessed in arc shapes in the circumferential directions as seen in the axial direction along the outer shapes of the inner pin outer rings 62*a* and 62*b* included in the inner pins 14*a*. The end surfaces of the support columns 73*a* in the radial directions have arc shapes as seen in the axial direction. The support columns 73*a* have screw holes 76*a* that are recessed along the thickness directions of the plate portion 72*a* and used for attaching the first holder portion 71*a* to the second holder portion 71*b*. In this embodiment, four screw holes 76*a* are provided at 90-degree intervals in the circumferential directions. From the viewpoint of weight reduction, in the thickness directions of the plate portion 72*a*, the surface opposite to the surface from which the support columns 73*a* project has an annular recessed groove 77*a* recessed in the thickness directions, on the radially outer side of the through hole at the center in the radial directions.

The second holder portion 71*b* has a disc shape having a through hole penetrating the second holder portion 71*b* in the thickness directions at the center in the radial directions. The second holder portion 71*b* includes a first portion 72*b* located at a center side in the radial directions, and a second portion 73*b* located radially outward of the first portion 72*b* and thinner than the first portion 72*b*. The first portion 72*b* has a plurality of press-fitting holes 74*b* in which end portions of the shanks 61*a* of the inner pins 14*a* on the other side can be press fitted, with intervals in the circumferential directions. The press-fitting holes 74*b* penetrate the second holder portion 71*b* in the thickness directions, and a total of eight press-fitting holes 74*b* are provided, corresponding to the number of the inner pins 14*a*. From the viewpoint of weight reduction, the outer peripheral surface of the first portion 72*b* has an annular recessed groove 75*b* that is recessed radially inward. The first portion 72*b* has a plurality of through holes 76*b* penetrating the first portion 72*b* along the thickness directions of the first portion 72*b* and used for attaching the first holder portion 71*a* to the second holder portion 71*b*, with intervals in the circumferential directions. In this embodiment, four through holes 76*b* are provided at 90-degree intervals, in accordance with the number and arrangement of the screw holes 76*a*. The second portion 73*b* of the second holder portion 71*b* has notches 79*b* that are arranged along the outer peripheral surface with intervals in the circumferential directions to reduce the thickness. Through holes penetrating the second holder portion 71*b* in the axial directions are provided in regions where the notches 79*b* are provided. The notches 79*b* and the through holes are located at positions corresponding to bolt holes 89*b* of the second outer ring 81*b* described later, and the second outer ring 81*b* is fixed to the second holder portion 71*b* with bolts 27*a*.

An example of a method for assembling the inner pin holder 15*a* will be described briefly as follows. First, end portions of the shanks 61*a* of the eight inner pins 14*a* on one side are press fitted in the eight press-fitting holes 74*a* of the first holder portion 71*a*. End portions of the shanks 61*a* of the inner pins 14*a* on the other side are press fitted in the eight press-fitting holes 74*b* of the second holder portion 71*b*. Thereafter, with four bolts 26*a* prepared beforehand, the bodies of the bolts 26*a* are inserted through the four through holes 76*b* and fastened by using the four screw holes 76*a*, thereby assembling the inner pin holder 15*a*. The support columns 73*a* located between the two inner pins 14*a* and the two inner pins 14*a* in the circumferential directions are located within the second through holes 52*a* of the cycloid gears 13*a* and 13*b* described later.

Figure 20:
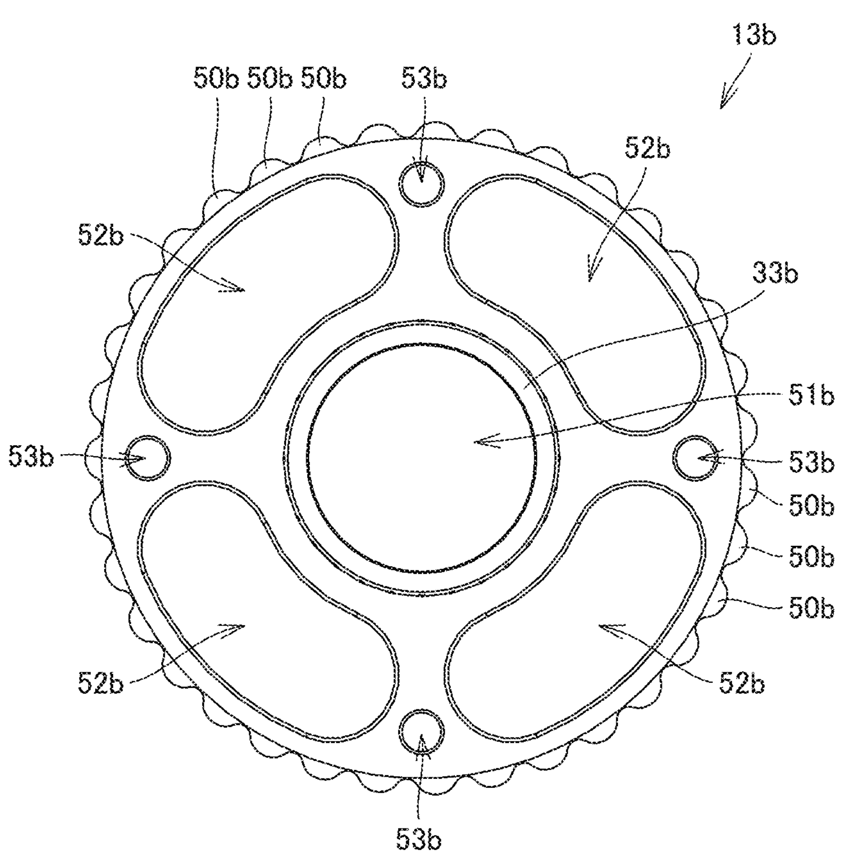
FIG. 20 is a view of a cycloid gear as seen in an axial direction.

Next, a configuration of the cycloid gear 13*b* will be described. FIG. 20 is a view of the cycloid gear 13*b* as seen in an axial direction. With reference to FIG. 20, the cycloid gear 13*b* is located radially outward of the first bearing 31*a*. The cycloid gear 13*b* includes a plurality of external teeth 50*b* arranged on the outer peripheral surface along the circumferential directions. In this embodiment, the external teeth 50*b* have an epitrochoid parallel curve. The number of the external teeth 50*b* is 35 in this embodiment. The cycloid gear 13*b* have a circular first through hole 51*b* the input unit 12*a* penetrates, and a plurality of second through holes 52*b* located radially outward of the first through hole 51*b* and arranged with intervals in the circumferential directions. From the viewpoint of weight reduction of the speed reducer 10*a*, the cycloid gear 13*b* has a plurality of circular third through holes 53*b* located further radially outward of the first through hole 51*b* and each located between the plurality of second through holes 52*b* arranged with intervals in the circumferential directions. Each of the plurality of third through holes 53*b* is located between adjacent ones of the second through holes 52*b* in the circumferential directions. In this embodiment, four second through holes 52*b* and four third through holes 53*b* are provided. The first outer ring 33*b* of the first bearing 31*b* is fitted in the first through hole 51*b* of the cycloid gear 13*b*. The second through holes 52*b* are elongated holes extending along the circumferential directions, and wall surfaces positioned in the radial directions have arc-shaped portions. A gap in the circumferential directions is defined between each of the second through holes 52*b* and two inner pins 14*a* in this second through hole 52*b*. A gap is also defined between the cycloid gear 13*b* and outer pins 17*a* described later.

In a manner similar to the cycloid gear 13*b*, the cycloid gear 13*a* includes a plurality of external teeth 50*a* arranged on the outer peripheral surface along the circumferential directions. In a manner similar to the cycloid gear 13*b*, the cycloid gear 13*a* includes a first through hole 51*a*, a plurality of second through holes 52*a*, and a plurality of third through holes 53*a*. A configuration of the cycloid gear 13*a* is similar to that of the cycloid gears 13*b*, and thus, will not be described in detail.

Then, a configuration of the outer pins 17*a* will be described briefly. The outer pins 17*a* have solid cylindrical shapes. Ends of the outer pins 17*a* in the axial directions are chamfered. The outer pins 17*a* are oriented in the speed reducer 10*a* such that the axial directions coincide with the directions indicated by arrow D1. In this embodiment, the number of the outer pins 17*a* is 36. That is, the number of the outer pins 17*a* is larger, by one, than the number of the external teeth 50*a* and 50*b* of the cycloid gears 13*a* and 13*b* described above. To restrict movement of the outer pins 17*a* in the axial directions, an annular outer pin guide plate 66*a* and a retaining ring 67*a* are provided on one side of the outer pins 17*a* in the axial directions. The retaining ring 67*a* is formed by partially cutting out an annular member and is shrunk radially inward, and can be placed radially inside the second inner ring 81*a*. After the placement, the retaining ring 67*a* returns to the original shape by elastic deformation.

Next, a configuration of the second bearing 16*a* as a main bearing will be described. In this embodiment, the second bearing 16*a* as the main bearing of the speed reducer 10*a* includes the second inner ring 81*a* having raceway surfaces 82*a* and 82*b*, the second outer ring 81*b* having raceway surfaces 83*a* and 83*b*, and a plurality of cylindrical rollers 84*a* and 84*b*. In the speed reducer 10*a* according to the first embodiment of the present disclosure, the second inner ring 81*a* of the second bearing 16*a* serves as an output shaft that reduces the rotation speed of the input shaft 11*a* and outputs the reduced rotation speed. The second bearing 16*a* is a crossed roller bearing. That is, the cylindrical rollers 84*a* and 84*b* included in the main bearing alternately crossed at right angles to each other in a space between the second inner ring 81*a* and the second outer ring 81*b* in the radial directions. Specifically, the rolling axes of the two cylindrical rollers 84*a* and 84*b* adjacent to each other in the circumferential directions are orthogonal to each other. In this embodiment, the second bearing 16*a* is a multi-row crossed roller bearing. Specifically, a row of the cylindrical rollers 84*a* and a row of the cylindrical rollers 84*b* are located adjacent to each other in the axial directions. The second bearing 16*a* is of a full component roller type. That is, the second bearing 16*a* does not include a retainer for retaining the plurality of cylindrical rollers 84*a* and 84*b*.

Figure 21:
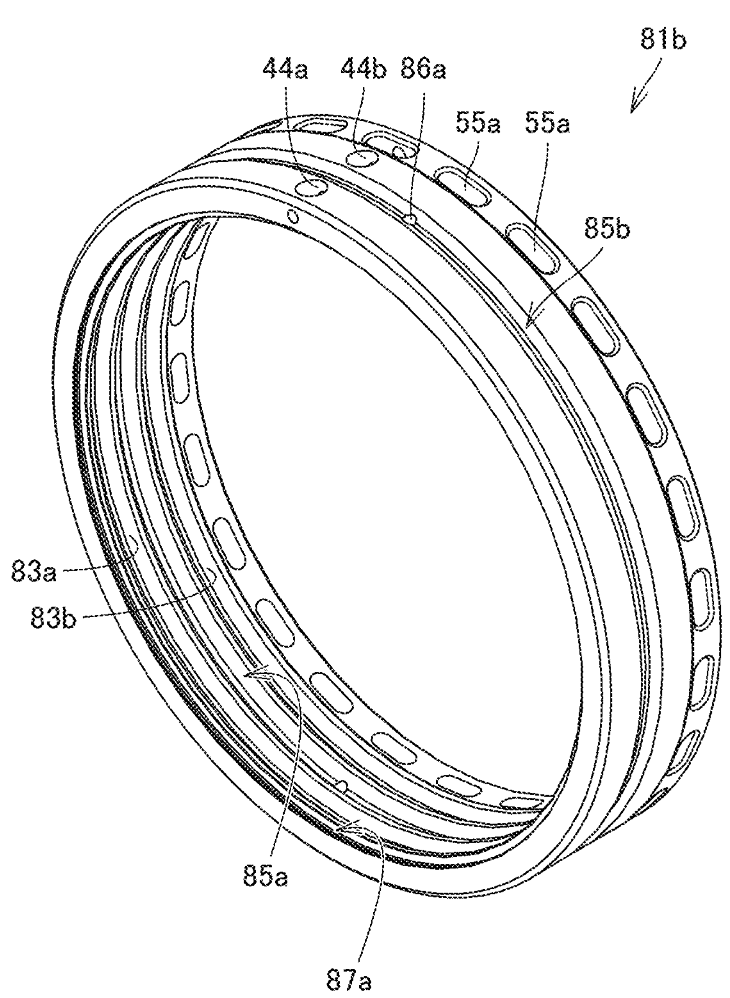
FIG. 21 is a schematic perspective view of a second outer ring.
Figure 22:
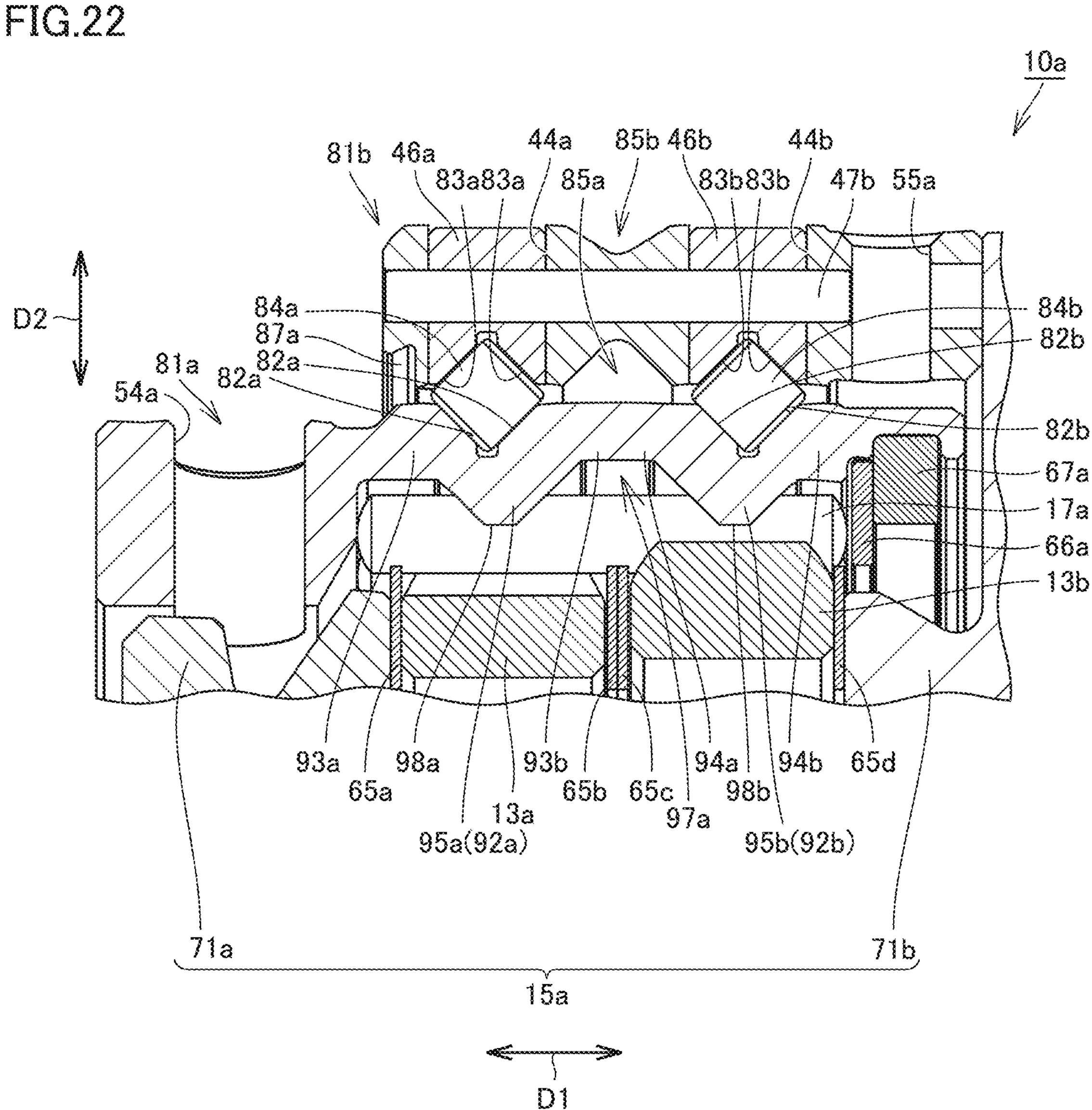
FIG. 22 is an enlarged schematic cross-sectional view illustrating a portion of the speed reducer shown in FIG. 5.
Figure 23:
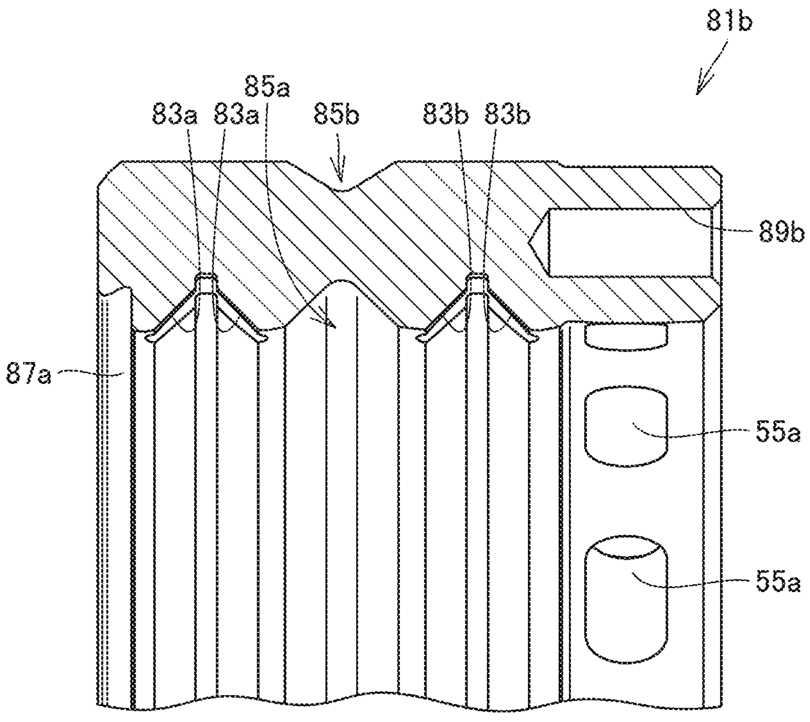
FIG. 23 is an enlarged schematic cross-sectional view illustrating a portion of the second outer ring.

Then, a specific configuration of the second inner ring 81*a* and the second outer ring 81*b* that are components of the second bearing 16*a* will be described. First, a configuration of the second outer ring 81*b* will be described. FIG. 21 is a schematic perspective view of the second outer ring 81*b*. FIG. 22 is an enlarged schematic cross-sectional view illustrating a portion of the speed reducer 10*a* shown in FIG. 5. FIG. 23 is an enlarged schematic cross-sectional view illustrating a portion of the second outer ring 81*b*. With reference to FIGS. 21, 22, and 23, the second outer ring 81*b* has an annular shape, and the inner peripheral surface of the second outer ring 81*b* includes the raceway surfaces 83*a* and 83*b* each provided in a plurality of rows on which the cylindrical rollers 84*a* and 84*b* roll. The raceway surfaces 83*a* and 83*b* are adjacent to each other in the axial directions. The raceway surfaces 83*a* and 83*b* are provided as a pair and arranged in the axial directions. Each of the raceway surfaces 83*a* and 83*b* is recessed radially outward in a V shape in cross section. The pair of raceway surfaces 83*a* and 83*b* tilts at 45 degrees relative to the axial directions. An annular oil groove 85*a* that is recessed radially outward in a V shape in cross section is provided between the raceway surfaces 83*a* and 83*b* in the axial directions. An annular oil groove 85*a* that is recessed radially inward in a V shape in cross section is also provided on the outer peripheral surface of the second outer ring 81*b*. In the axial directions, the position of the oil groove 85*a* and the position of the oil groove 85*b* are the same. An oil hole 86*a* penetrating the second outer ring 81*b* in the axial directions is provided to connect the oil groove 85*a* and the oil groove 85*b*. An opening portion of the second outer ring 81*b* on the side opposite to the bolt holes 89*b* described later in the axial direction has an annular groove 87*a* that is recessed radially outward. The annular groove 87*a* is used for attaching a seal for enhancing hermeticity. In this embodiment, no seals are used and shown in the drawings.

The second outer ring 81*b* has insertion holes 44*a* and 44*b* penetrating the second outer ring 81*b* from the outer peripheral surface to a region where the cylindrical rollers 84*a* and 84*b* are located, and the cylindrical rollers 84*a* and 84*b* are inserted in the insertion holes 44*a* and 44*b*. The plurality of cylindrical rollers 84*a* and 84*b* are sequentially inserted in the insertion holes 44*a* and 44*b*. After all the cylindrical rollers 84*a* and 84*b* have been inserted, a spacer 45*a* for adjusting a gap between the cylindrical rollers 84*a* and 84*b* in the circumferential directions is inserted. After all the members have been inserted, the insertion holes 44*a* and 44*b* are closed by lids 46*a* and 46*b*. The lids 46*a* and 46*b* are fixed by lid fixing pins 47*b* penetrating the lids 46*a* and 46*b* and portions of the second outer ring 81*b* in the axial directions. From the viewpoint of weight reduction, the second outer ring 81*b* has elongated holes 55*a* each having the longitudinal directions in the circumferential directions, penetrating the second outer ring 81*b* in the radial directions, and arranged at regular intervals in the circumferential directions. The second outer ring 81*b* has a plurality of bolt holes 89*b* arranged with intervals in the circumferential directions. The bolt holes 89*b* are used for attaching the second outer ring 81*b* to the inner pin holder 15*a*, specifically, the second holder portion 71*b*, with the bolts 27*a*. That is, the second outer ring 81*b* is also a fixing portion and neither rotates nor revolves, in a manner similar to the inner pin holder 15*a*.

Figure 24:
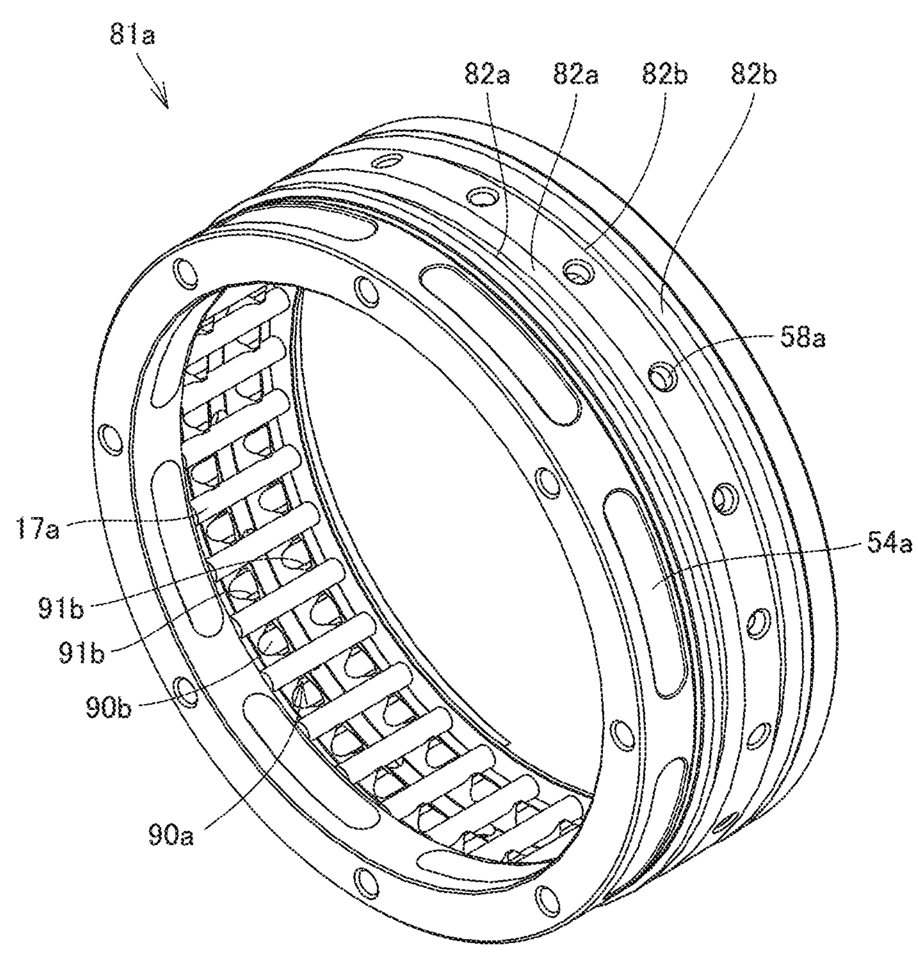
FIGS. 24 and 25 are schematic perspective views of the second inner ring.
Figure 25:
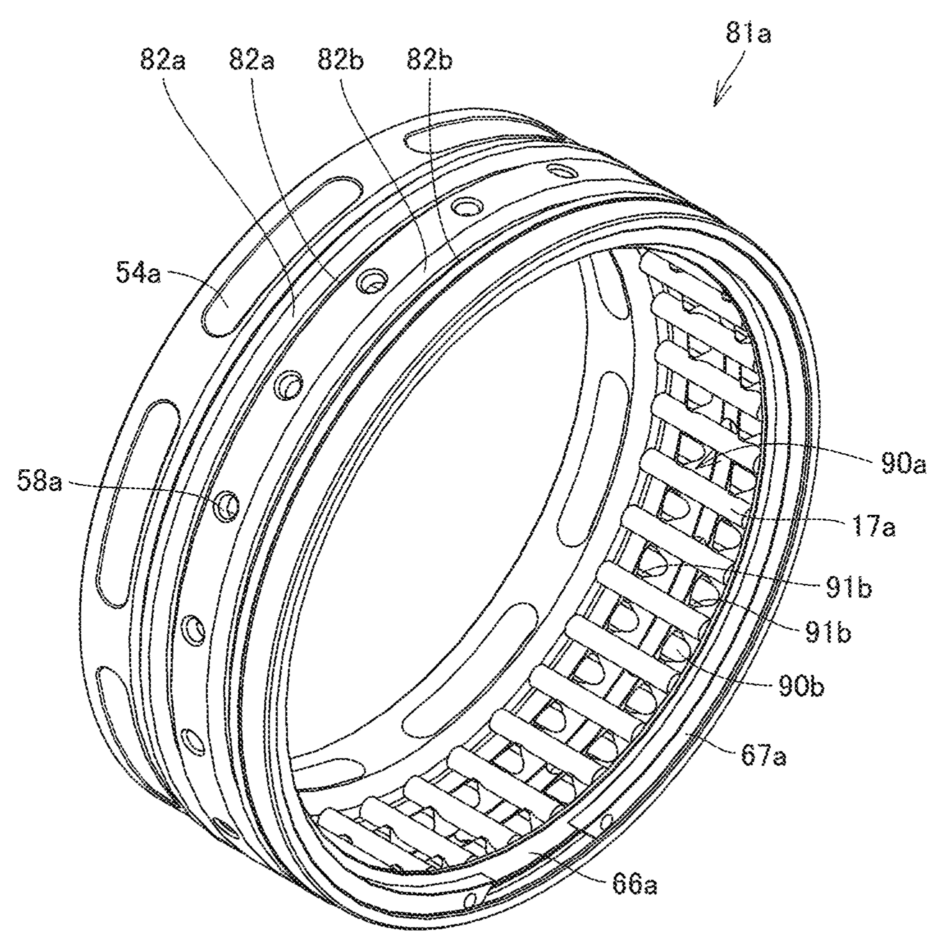
Figure 26:
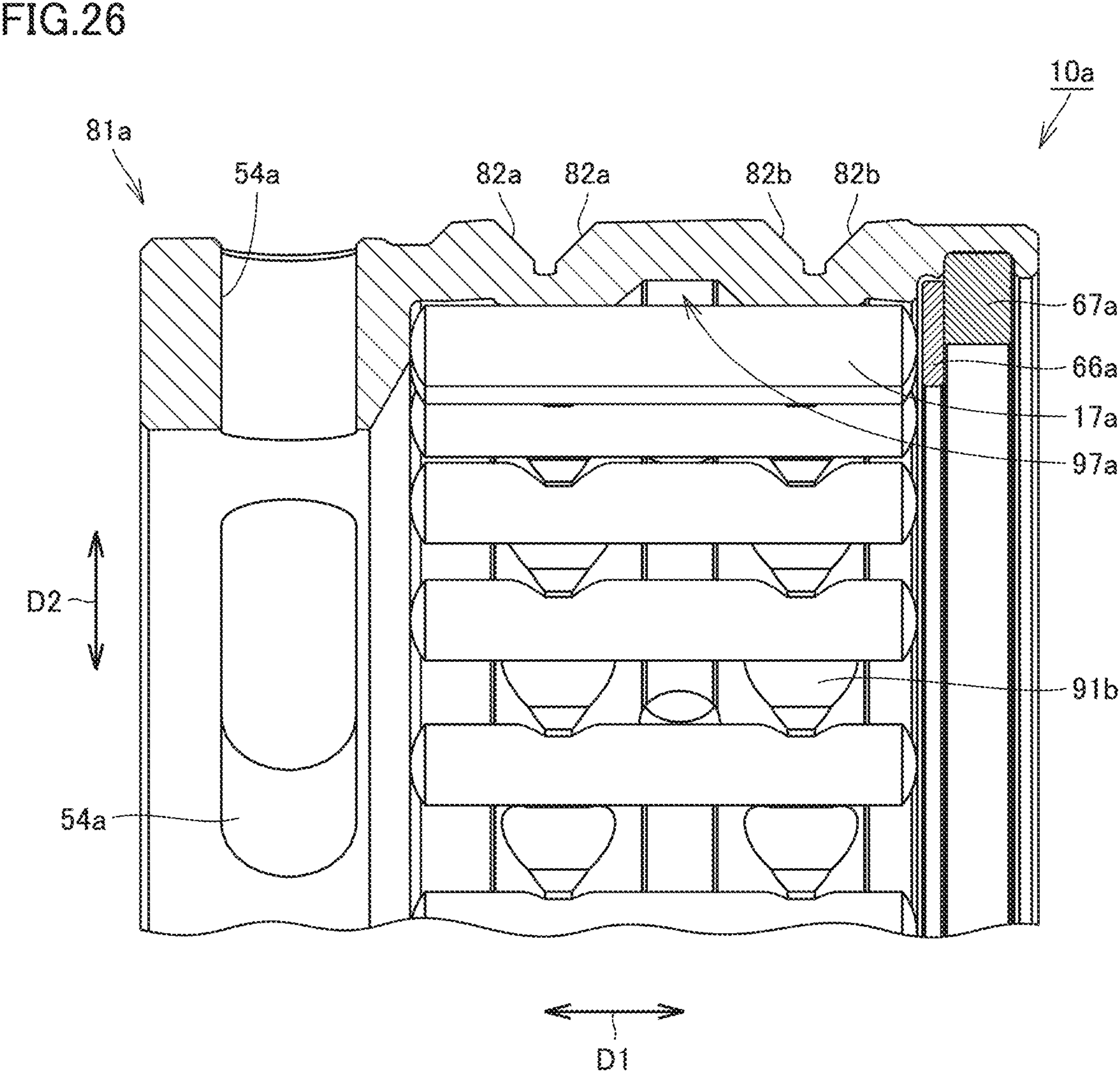
FIG. 26 is an enlarged schematic cross-sectional view illustrating a portion of the speed reducer including the second inner ring.
Figure 27:
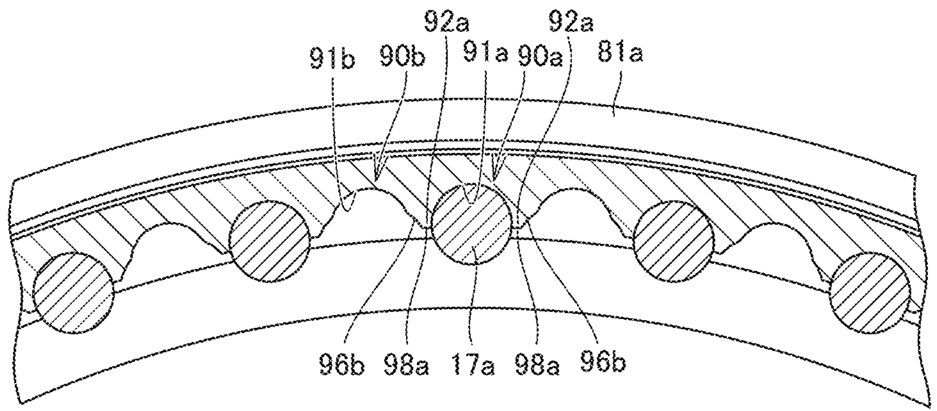
FIG. 27 is an enlarged schematic cross-sectional view illustrating a portion of the second inner ring and one outer pin.
Figure 28:
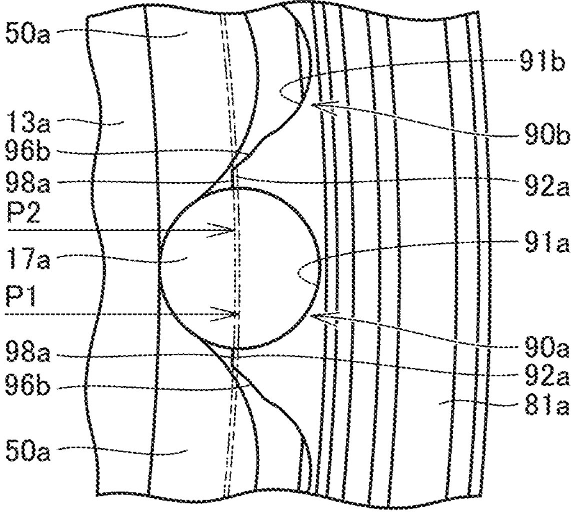
FIG. 28 is a further enlarged schematic view illustrating the portion of the second inner ring and the outer pin shown in FIG. 27.

Then, a configuration of the second inner ring 81*a* will be described. FIGS. 24 and 25 are schematic perspective views of the second inner ring 81*a*. FIGS. 24 and 25 show the second inner ring 81*a* as seen in different directions. FIG. 26 is an enlarged schematic cross-sectional view illustrating a portion of the speed reducer 10*a* including the second inner ring 81*a*. FIG. 26 does not show some members. FIG. 27 is an enlarged schematic cross-sectional view illustrating a portion of the second inner ring 81*a* and one outer pin 17*a*. FIG. 28 is a further enlarged schematic view illustrating the portion of the second inner ring 81*a* and the outer pin 17*a* shown in FIG. 27. For facilitating understanding, FIGS. 24 through 28 also show the outer pin 17*a*.

With reference to FIGS. 24, 25, 26, 27, and 28, the second inner ring 81*a* is an annular member, and the outer peripheral surface of the second inner ring 81*a* has raceway surfaces 82*a* and 82*a* on which the cylindrical rollers 84*a* and 84*b* roll. From the viewpoint of weight reduction, the second inner ring 81*a* has elongated holes 54*a* each having the longitudinal directions in the circumferential directions, penetrating the second inner ring 81*a* in the radial directions, and arranged at regular intervals in the circumferential directions. The second inner ring 81*a* has a plurality of oil holes 58*a* each having the longitudinal directions in the circumferential directions, penetrating the second inner ring 81*a* in the radial directions, and arranged at regular intervals in the circumferential directions.

The raceway surfaces 82*a* and 82*b* are adjacent to each other in the axial directions. The raceway surfaces 82*a* and 82*b* are provided as a pair and arranged in the axial directions. Each of the raceway surfaces 82*a* and 82*b* is recessed radially inward in a V shape in cross section. The pair of the raceway surfaces 82*a* and 82*b* tilts at 45 degrees relative to the axial directions. The raceway surfaces 82*a* and 82*b* can accommodate the cylindrical rollers 84*a* and 84*b* in a space between the raceway surfaces 82*a* and 82*b* and the raceway surfaces 83*a* and 83*b* of the second outer ring 81*b* opposed to the raceway surfaces 82*a* and 82*b* in the radial directions. The cylindrical rollers 84*a* and 84*b* are arranged in the form of a crossed roller bearing, that is, the rolling axes of the cylindrical rollers 84*a* and 84*b* are alternately crossed at right angles to each other, between the raceway surfaces 82*a* and 82*b* and the raceway surfaces 83*a* and 83*b*.

Here, the inner peripheral surface of the second inner ring 81*a* has a plurality of outer pin housing grooves 90*a* that are recessed radially outward as seen the axial direction, arranged along the circumferential directions, and configured to house the outer pins 17*a*. A wall surface 91*a* constituting each of the outer pin housing grooves 90*a* includes a curved surface constituting a portion of an arc surface as seen in the axial direction. The wall surface 91*a* constituting each outer pin housing groove 90*a* is constituted by a so-called an R surface as seen in the axial direction. The inner peripheral surface of the second inner ring 81*a* also has slots 90*b* that are simply recessed radially outward as seen in the axial direction. The outer pin housing grooves 90*a* and the slots 90*b* are arranged alternately along the circumferential directions. That is, the outer pins 17*a* are arranged alternately in the circumferential directions in a groove-like recessed portion on a radially inner side of the second inner ring 81*a*.

The wall surface 91*a* along the circumferential directions constituting the outer pin housing grooves 90*a* have nails 92*a* and 92*b* that restrict radially inward movement of the outer pins 17*a* form the outer pin housing grooves 90*a*. In this embodiment, the second bearing 16*a* are crossed roller bearings arranged in multiple rows, specifically, two rows in the axial directions. In the inner peripheral surface of the second inner ring 81*a*, axial center portions 95*a* and 95*b* project radially inward relative to the axial end portions 93*a*, 93*b*, 94*a*, and 94*b* in each of the rows of the cylindrical rollers 84*a* and 84*b* (see especially FIG. 22). This configuration in which the axial center portions 95*a* and 95*b* project radially inward can make the thickness of a portion of the second inner ring 81*a* having the raceway surfaces 82*a* and 82*b* equal to other portions, such as the axial end portions 93*a*, 93*b*, 94*a*, and 94*b*. This can suppress a decrease in rigidity of a portion having the nails 92*a* and 92*b*. The nails 92*a* and 92*b* are located on the axial center portions 95*a* and 95*b*. An oil sump 97*a* in which lubricating oil is accumulated is formed between the axial center portions 95*a* and 95*b* in the axial directions.

As seen in the axial direction, a pitch circle diameter (PCD) of the outer pins 17*a* is larger than a diameter of an imaginary circle connecting the positions of the nails 92*a* in the circumferential directions. Specifically, as seen suppose a pitch circle diameter corresponding to an imaginary circle connecting the rotation centers of the outer pins 17*a* is a diameter P1 and the diameter of the imaginary circle connecting the positions of the nails 92*a* in the circumferential directions is a diameter P2, the diameter P1 is larger than the diameter P2. The inner diameter surface of each of the nails 92*a* is formed in a curved shape with a single curvature radius from the center of the imaginary circle connecting the positions of the nails 92*a* in the circumferential directions. A curvature radius R in this case is represented as a diameter P2/2.

A wall surface 91*b* in the circumferential directions not constituting each outer pin housing groove 90*a* has a relief portion 96*b* that is recessed radially outward to reduce the thickness. The relief portions 96*b* are located such that the external teeth 50*a* and 50*b* of the cycloid gears 13*a* and 13*b* do not interfere with the relief portions 96*b*. The wall surface constituting each of the relief portions 96*b* has an arc shape as seen in the axial direction.

Next, an example of a method for assembling the speed reducer 10*a* described above will be described. First, the input shaft 11*a* and the first bearings 31*a* and 31*b* are prepared as described above to assemble the input unit 12*a*. In this assembly, the first outer rings 33*a* and 33*b* are press fitted in the first through holes 51*a* and 51*b* of the cycloid gears 13*a* and 13*b* beforehand such that the assembly is performed in a state where the cycloid gears 13*a* and 13*b* are attached to the input unit 12*a*. Thereafter, the inner pins 14*a* are placed in the second through holes 52*a* and 52*b* of the cycloid gears 13*a* and 13*b*, and the inner pin holder 15*a* is attached to the input unit 12*a* in the axial directions. The outer pins 17*a* are housed in the outer pin housing grooves 90*a* formed on the inner peripheral surface of the second inner ring 81*a*. At this time, the outer pins 17*a* are fitted in the outer pin housing grooves 90*a* from the rear side (side where the outer pin guide plate 66*a* and the retaining ring 67*a* are to be located) of the second inner ring 81*a*. Thereafter, the outer pin guide plate 66*a* and the retaining ring 67*a* are attached to the second inner ring 81*a*. Then, the second outer ring 81*b* is attached to the radially outer side of the second inner ring 81*a*. Subsequently, the plurality of cylindrical rollers 84*a* and 84*b* are alternately inserted through the insertion holes 44*a* and 44*b* such that the rolling axes intersect perpendicularly to each other, and after all the cylindrical rollers 84*a* and 84*b* have been inserted, the spacer 45*a* is inserted. Thereafter, the lids 46*a* and 46*b* are fitted in the insertion holes 44*a* and 44*b*, and the lid fixing pins 47*b* are attached to fix the lids 46*a* and 46*b*. Then, the input unit 12*a* to which the cycloid gears 13*a* and 13*b*, the inner pins 14*a*, and the inner pin holder 15*a* are attached, is attached to the radially inner side of the second inner ring 81*a* housing the outer pins 17*a*. At this time, even when the second inner ring 81*a* is tilted with the front side (side opposite to the rear side in the axial directions) facing upward, since the nails 92*a* on the wall surface constituting the outer pin housing grooves 90*a* prevent the outer pins 17*a* in the outer pin housing grooves 90*a* from falling off from the rear side. In this manner, the cycloid gears 13*a* and 13*b* and the input unit 12*a* are attached to the radially inner side of the second inner ring 81*a*, thereby assembling the speed reducer 10*a*.

Next, operation of the speed reducer 10*a* in the first embodiment of the present disclosure will be described. When the input shaft 11*a* rotates (spins) at high speed, the eccentric first inner rings 32*a* and 32*b* of the first bearings 31*a* and 31*b* rotate (spin) accordingly. Here, in the cycloid gears 13*a* and 13*b* in which the first outer rings 33*a* and 33*b* of the first bearings 31*a* and 31*b* are press fitted in the first through holes 51*a* and 51*b*, the inner pins 14*a* are located in the second through holes 52*a* and 52*b*. Since the shanks 61*a* of the inner pins 14*a* are press fitted in the inner pin holder 15*a* as a fixing portion, the inner pins 14*a* themselves do not rotate. Thus, the cycloid gears 13*a* and 13*b* do not revolve, and spin, shifting by one pitch at each turn of the input shaft 11*a* while maintaining eccentric motion. With the spinning of the cycloid gears 13*a* and 13*b* by one pitch, the outer pins 17*a* meshing with the external teeth 50*a* and 50*b* of the cycloid gears 13*a* and 13*b* revolve while spinning in the outer pin housing grooves 90*a* formed on the inner peripheral surface of the second inner ring 81*a*. With the revolution of the outer pins 17*a* housed in the outer pin housing grooves 90*a*, the wall surface on the inner circumferential side of the second inner ring 81*a* constituting the outer pin housing grooves 90*a* is pushed in the rotation direction (spinning direction), and the second inner ring 81*a* spins at low speed, that is, spins by one pitch. In this manner, the rotation speed input from the input shaft 11*a* is reduced and output from the second inner ring 81*a*. In this case, the direction of rotation of the input shaft 11*a* is the same as the direction of rotation of the second inner ring 81*a*. In this embodiment, since the number of the outer pins 17*a* is 36 and the number of the external teeth 50*a* and 50*b* of the cycloid gears 13*a* and 13*b* is 35, the rotation speed of the second inner ring 81*a* as the output shaft is 1/36 of the rotation speed of the input shaft 11*a*. That is, in this embodiment, one pitch corresponds to 1/36 of the circumference.

In the speed reducer 10*a* of the present disclosure, the inner peripheral surface of the second inner ring 81 a has the plurality of outer pin housing grooves 90*a* that are recessed radially outward in the axial directions, are arranged along the circumferential directions, and houses the outer pins 17*a*. The wall surface 91*a* along the circumferential directions constituting the outer pin housing grooves 90*a* have the nails 92*a* and 92*b* that restrict radially inward movement of the outer pins 17*a* form the outer pin housing grooves 90*a*. With this configuration, in rotation of the cycloid gears 13*a* and 13*b* during operation of the speed reducer 10*a*, even when a gap between the cycloid gears 13*a* and 13*b* and the outer pins 17*a* is enlarged, the nails 92*a* and 92*b* restrict falling of the outer pins 17*a* radially inward. Then, the posture of the outer pins 17*a* in the outer pin housing grooves 90*a* is stabilized so that rattles of the outer pins 17*a* can be thereby reduced. Accordingly, even when a gap between the cycloid gears 13*a* and 13*b* and the outer pins 17*a* is enlarged, snagging between the cycloid gears 13*a* and 13*b* and the outer pins 17*a* is reduced so that rotation of the outer pins 17*a* housed in the outer pin housing grooves 90*a* and rotation of the cycloid gears 13*a* and 13*b* thereby become smoother. As a result, occurrence of rotation noise during operation of the speed reducer 10*a* is reduced, and quietness is enhanced. In this case, rotational smoothness of the rotating parts relative to the fixed parts of the speed reducer 10*a* can be enhanced.

In the second inner ring 81*a* including the nails 92*a* and 92*b* described above, the outer pins 17*a* can be housed and held in the outer pin housing grooves 90*a* beforehand. In this case, even when the second inner ring 81*a* is tilted with the front side facing upward in a state where the outer pins 17*a* are housed in the outer pin housing grooves 90*a*, falling off of the outer pins 17*a* in the outer pin housing grooves 90*a* from the rear side can be prevented. Accordingly, assembly can be performed by tilting the second inner ring 81*a* with the outer pins 17*a* placed in the outer pin housing grooves 90*a* beforehand, and workability in assembling the speed reducer 10*a* can be enhanced.

In this embodiment, the wall surface 91*b* in the circumferential directions not constituting the outer pin housing grooves 90*a* has the relief portion 96*b* that is recessed radially outward to reduce the thickness. This reduces the probability of interference between the external teeth 50*a* and 50*b* of the cycloid gears 13*a* and 13*b* and the inner peripheral surface of the second inner ring 81*a* during rotation of the cycloid gears 13*a* and 13*b*. Accordingly, the cycloid gears 13*a* and 13*b* rotate more smoothly, and quietness is enhanced.

In this embodiment, as seen in the axial direction, the pitch circle diameter of the outer pins 17*a* is larger than the diameter of the imaginary circle connecting the positions of the nails 92*a* and 92*b* in the circumferential directions. This further ensures restriction of radially inward movement of the outer pins 17*a* by the nails 92*a* and 92*b*.

In this embodiment, on the inner peripheral surface of the second inner ring 81*a*, the axial center portions 95*a* and 95*b* project radially inward relative to the axial end portions 93*a*, 93*b*, 94*a*, and 94*b*. The axial center portions 95*a* and 95*b* have the nails 92*a* and 92*b*. Thus, the contact area between the nails 92*a* and 92*b* and the outer pins 17*a* is reduced so that smooth rotation of the outer pins 17*a* can be ensured. In the axial center portions 95*a* and 95*b*, the outer pins 17*a* are guided by the nails 92*a* and 92*b*. This reduces the risk of tilting of the outer pins 17_a_ in the axial directions, and more stable rotation can be ensured.

In this embodiment, inner peripheral surfaces 98_a_ and 98_b_ of the nails 92_a_ and 92_b_ are each formed in a curved shape with a single curvature radius from the center of the imaginary circle connecting the positions of the nails 92_a_ and 92_b_ in the circumferential directions. Thus, during rotation of the cycloid gears 13_a_ and 13_b_, the external teeth 50_a_ and 50_b_ of the cycloid gears 13_a_ and 13_b_ can easily pass over the positions where the nails 92_a_ and 92_b_ are provided. Accordingly, the cycloid gears 13_a_ and 13_b_ rotate more smoothly, and quietness is enhanced.

In this embodiment, the second bearing 16_a_ includes a multi-row crossed roller bearing in which the cylindrical rollers 84_a_ and 84_b_ are arranged in multiple rows in the axial directions. Thus, loads applied in various directions can be appropriately received by the second bearing 16_a_ with a compact configuration. Accordingly, the size of the speed reducer 10_a_ can be easily reduced. In addition, the rotation center axis of the crossed roller bearing and the rotation center axes of components constituting of the speed reducer mechanism can be easily placed on the same plane, thus making it possible to reduce torsion between the input shaft 11_a_ and the second inner ring 81_a_ as an output shaft caused by a load torque.

In this embodiment, in the inner peripheral surface of the second inner ring 81_a_, the axial center portions 95_a_ and 95_b_ project radially inward relative to the axial end portions 93_a_, 93_b_, 94_a_, and 94_b_ in each of the rows of the cylindrical rollers 84_a_ and 84_b_. The nails 92_a_ and 92_b_ are located on the axial center portions 95_a_ and 95_b_. Thus, it is possible to bring the nails 92_a_ and 92_b_ on the axial center portions 95_a_ and 95_b_ corresponding to the cylindrical rollers 84_a_ and 84_b_ in each row into contact with the outer pins 17_a_. Then, the outer pins 17_a_ are guided by the plurality of nails 92_a_ and 92_b_ in the axial directions so that the risk of tilting of the outer pins 17_a_ in the axial directions can be further reduced. As a result, more stable rotation can be ensured.

Here, in regard to the input shaft 11_a_ included in the input unit 12_a_ and the first bearings 31_a_ and 31_b_, specifically, the input shaft 11_a_ and the eccentric first inner rings 32_a_ and 32_b_ included in the first bearings 31_a_ and 31_b_, the first inner rings 32_a_ and 32_b_ need to be rotated together with the input shaft 11_a_, and thus, are possibly formed integrally with the input shaft 11_a_. In this case, the input shaft 11_a_ and the first inner rings 32_a_ and 32_b_ can be possibly formed from rod-shaped members of the same metal by shaving, for example. However, in this structure, functions required for the components, specifically, the input shaft 11_a_ and the first inner rings 32_a_ and 32_b_, cannot be made different. For this reason, this structure is not preferable.

In the speed reducer 10_a_ of the present disclosure, the first inner rings 32_a_ and 32_b_ are provided separately from the input shaft 11_a_. The input unit 12_a_ includes the movement restrictors 40_a_ and 40_b_ that restrict movement of the first inner rings 32_a_ and 32_b_ relative to the input shaft 11_a_ in the circumferential directions. This configuration enables the input shaft 11_a_ and the first inner rings 32_a_ and 32_b_ that are components of the input unit 12_a_ to be made of different materials. Then, a material suitable for the function required for each component can be selected to assemble the input unit 12_a_. In this case, since the input unit 12_a_ includes the movement restrictor 40_a_ that restricts movement of the first inner rings 32_a_ and 32_b_ relative to the input shaft 11_a_ in the circumferential directions, the first inner rings 32_a_ and 32_b_ can be reliably positioned in the circumferential directions, and the first inner rings 32_a_ and 32_b_ can be reliably rotated together with the input shaft 11_a_. Accordingly, stable operation of the speed reducer 10_a_ can be ensured. In addition, since the components are made of separate members, accuracy in grinding of, for example, the eccentric first inner rings 32_a_ and 32_b_ can be easily increased so that productivity can be thereby enhanced. Further, since the first inner rings 32_a_ and 32_b_ are separate members, a change of eccentricity of the first inner rings 32_a_ and 32_b_ and sorting of accuracy, which would be difficult in an integrated-type input unit 12_a_, can be easily performed. That is, the first inner rings 32_a_ and 32_b_ fabricated in accordance with requirements can be selected and combined with the separately fabricated input shaft 11_a_ to produce the input unit 12_a_ that meets requirements. Since the input shaft 11_a_ is also a separate member, it becomes easier to perform additional machining on the input shaft 11_a_ or incorporate design changes according to an application. Specifically, a material exemplified by a light metal, such as aluminum, or a resin is employed as a material for the input shaft 11_a_ that is a component constituting the input unit 12_a_ in consideration of weight reduction and torque resistance, whereas bearing steel is employed as a material for the first inner rings 32_a_ and 32_b_ from the viewpoint of enhancement of durability. The foregoing speed reducer 10_a_ can ensure stable operation with enhanced productivity.

In this embodiment, the movement restrictors 40_a_ and 40_b_ restrict movement of the first inner rings 32_a_ and 32_b_ relative to the input shaft 11_a_ in the axial directions. Thus, the first inner rings 32_a_ and 32_b_ are reliably positioned in the axial directions, thereby ensuring more stable operation of the speed reducer 10_a_.

In this embodiment, the movement restrictors 40_a_ and 40_b_ include the first keyways 41_a_ and 41_b_ recessed from the outer peripheral surface of the input shaft 11_a_, the second keyways 42_a_ and 42_b_ recessed from the inner peripheral surfaces of the first inner rings 32_a_ and 32_b_, and the key members 43_a_ and 43_b_ fitted in both the first keyways 41_a_ and 41_b_ and the second keyways 42_a_ and 42_b_. Accordingly, by fitting the key members 43_a_ and 43_b_ in the first keyways 41_a_ and 41_b_ and the second keyways 42_a_ and 42_b_, the first inner rings 32_a_ and 32_b_ can be reliably positioned in the circumferential directions.

In this embodiment, the first keyways 41_a_ and 41_b_ extend in the axial directions on a portion of the outer peripheral surface of the input shaft 11_a_ in the circumferential directions. The second keyways 42_a_ and 42_b_ are located at positions facing the first keyways 41_a_ and 41_b_. The key members 43_a_ and 43_b_ have rod shapes extending in the axial directions. Accordingly, the first inner rings 32_a_ and 32_b_ can be more reliably positioned in the circumferential directions with a relatively simple structure.

In this embodiment, the flanges 37_a_ and 37_b_ projecting radially outward are provided at least on end portions of the first inner rings 32_a_ and 32_b_ on one side in the axial directions. Thus, it is possible to restrict movement of the retainers 35_a_ and 35_b_ included in the needle cages 36_a_ and 36_b_ in the axial directions by using the flanges 37_a_ and 37_b_. As a result, more stable operation of the speed reducer 10_a_ can be ensured.

In this embodiment, the input unit 12_a_ includes the guide ring 49_a_ provided separately from the input shaft 11_a_ and the first inner rings 32_a_ and 32_b_, having the disc shape, located at least on one side of the first inner rings 32_a_ and 32_b_ in the axial directions, and projecting radially outward relative to the raceway surfaces of the first inner rings 32_a_ and 32_b_. Thus, it is also possible to restrict movement of the retainers 35_a_ and 35_b_ included in the needle cages 36_a_ and 36_b_ in the axial directions by using the guide ring 49*a*. As a result, more stable operation of the speed reducer 10*a* can be ensured. Similarly, a material for the guide ring 49*a* included in the input unit 12*a* can be selected independently of materials for other components, and may be a resin such as PEEK containing fibers or a light metal such as aluminum, for example.

In this embodiment, the pair of first bearings 31*a* and 31*b* is disposed in the axial directions. The first inner rings 32*a* and 32*b* as a pair included in the pair of first bearings 31*a* and 31*b*, respectively, are disposed with a 180-degree phase shift in the circumferential directions. Thus, influence of the eccentric first inner rings 32*a* and 32*b* during rotation of the input shaft 11*a* can be reduced, and more stable rotation of the input shaft 11*a* can be ensured.

In this embodiment, the first inner rings 32*a* and 32*b* are fixed to the input shaft 11*a* by interference fitting. This also restricts movement of the first inner rings 32*a* and 32*b* relative to the input shaft 11*a* in the axial directions.

Figure 29:
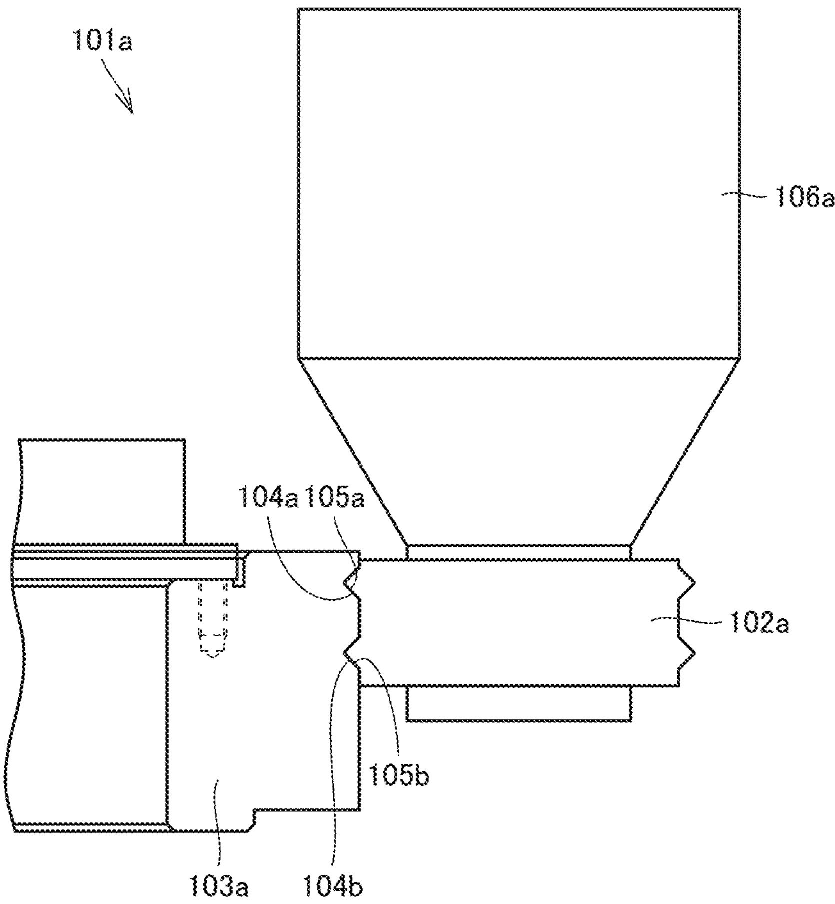
FIG. 29 is a schematic view illustrating an example of a cylindrical grinder used for grinding the second inner ring.

An example of a method for fabricating the second inner ring 81*a* in the members constituting the speed reducer 10*a* will be briefly described. First, an annular metal member is prepared and subjected to a treatment such as shaving to have an outer diameter shape of the second inner ring 81*a*. Then, grinding is performed on the raceway surfaces 82*a* and 82*b* that require smoothness. FIG. 29 is a schematic view illustrating an example of a cylindrical grinder used for grinding the second inner ring 81*a*. With reference to FIG. 29, a cylindrical grinder 101*a* includes a grindstone part 102*a* and a rotary dresser 103*a*. The cylindrical grindstone part 102*a* for grinding an object includes projections 104*a* and 104*b* projecting radially outward and corresponding to the raceway surfaces 82*a* and 82*b* of the second inner ring 81*a*. An interval between the projections 104*a* and 104*b* is substantially equal to an interval between the raceway surfaces 82*a* and 82*b*. The rotary dresser 103*a* having a cylindrical portion includes recesses 105*a* and 105*b* that are recessed radially inward and correspond to the inner peripheral surface of the second inner ring 81*a*.

With this cylindrical grinder 101*a*, the raceway surfaces 82*a* and 82*b* of the second inner ring 81*a* are ground. Specifically, although not shown, the second inner ring 81*a* is attached to the radially outer side of the rotary dresser 103*a*. In a state where the projections 104*a* and 104*b* are pushed against the raceway surfaces 82*a* and 82*b* from the radially outer side of the second inner ring 81*a*, the grindstone part 102*a* attached to the spindle 106*a* is rotated to grind the raceway surfaces 82*a* and 82*b*.

In this manner, even when the spindle 106*a* thermally expands during grinding, the risk of shift of the interval between the raceway surfaces 82*a* and 82*b* can be significantly reduced. Specifically, if the raceway surfaces 82*a* and 82*b* are ground one by one, grinding is performed with a shift of the interval between the raceway surfaces 82*a* and 82*b* because of thermal expansion of the spindle 106*a* during grinding, machining errors of the cylindrical grinder 101*a*, and other reasons, resulting in degradation of dimensional accuracy. On the other hand, the fabrication method described above can significantly reduce shifts of the interval and depth of the raceway surfaces 82*a* and 82*b*. Accordingly, the second inner ring 81*a* can be accurately fabricated. In addition, since the raceway surfaces 82*a* and 82*b* can be ground at a time, lead time can be shortened, as compared to the case where the raceway surfaces 82*a* and 82*b* are ground one by one. A similar configuration is also employed for the raceway surfaces 83*a* and 83*b* of the second outer ring 81*b*, and the raceway surfaces 83*a* and 83*b* are ground at a time. Then, dimensional accuracy can be increased and the lead time can be shortened.

OTHER EMBODIMENTS

In the embodiment described above, the pair of cycloid gears is arranged in the axial directions. However, the present disclosure is not limited to this example, and the speed reducer may include one cycloid gear.

In the embodiment described above, the lids are provided at the same positions in the circumferential directions as the positions of the multi-row crossed roller bearings. However, the present disclosure is not limited to this example, and the lids may be provided with a shift in the circumferential directions.

The embodiment described above employs the multi-row crossed roller bearing. However, the present disclosure is not limited to this example, a multi-row angular bearing may be employed. At least one of the first bearing or the second bearing may employ another bearing, for example, a combination of a radial bearing and an axial bearing. A plain bearing may also be employed.

In the embodiment described above, in the crossed roller bearing, a gap between the cylindrical rollers is adjusted with the spacer. However, the present disclosure is not limited to this example, the crossed roller bearing may include a retainer retaining cylindrical rollers or may include a separator located between cylindrical rollers.

It should be understood that the embodiment disclosed here is illustrative and non-restrictive in every respect. The scope of the present invention is defined by the claims and is intended to include any modifications within the scope and meaning equivalent to the claims.

DESCRIPTION OF REFERENCE NUMERALS

10*a* speed reducer, 11*a* input shaft, 12*a* input unit, 13*a*, 13*b* cycloid gear, 14*a* inner pin, 15*a* inner pin holder, 16*a* second bearing, 17*a* outer pin, 21*a* first axial end, 21*b* second axial end, 23*a* axial through hole, 24*a* axial inner peripheral surface keyway, 25*a*, 98*a* inner peripheral surface, 25*b* outer peripheral surface, 26*a*, 27*a* bolt, 29*a* first input shaft bearing, 29*b* second input shaft bearing, 31*a*, 31*b* first bearing, 32*a*, 32*b* first inner ring, 33*a*, 33*b* first outer ring, 34*a*, 34*b* needle roller, 35*a*, 35*b* retainer, 36*a*, 36*b* needle cage, 37*a*, 37*b* flange, 40*a*, 40*b* movement restrictor, 41*a*, 41*b* first keyway, 42*a*, 42*b* second keyway, 43*a*, 43*b* key member, 44*a*, 44*b* insertion hole, 45*a* spacer, 46*a*, 46*b* lid, 47*b* lid fixing pin, 48*a*, 48*b* collar, 49*a* guide ring, 50*a*, 50*b* external teeth, 51*a*, 51*b* first through hole, 52*a*, 52*b* second through hole, 53*a*, 53*b* third through hole, 54*a*, 55*a* elongated hole, 58*a*, 86*a* oil hole, 61*a* shank, 62*a*, 62*b* inner pin outer ring, 63*a* roller, 64*a*, 64*b*, 64*c*, 64*d*, 65*a*, 65*b*, 65*c*, 65*d* thrust washer, 66*a* outer pin guide plate, 67*a* retaining ring, 71*a* first holder portion, 71*b* second holder portion, 72*a* plate portion, 72*b* first portion, 73*a* support column, 73*b* second portion, 74*a*, 74*b* press-fitting hole, 75*a*, 75*b*, 77*a* recessed groove, 76*a* screw hole, 76*b* through hole, 78*a*, 78*b* step, 79*b* notch, 81*a* second inner ring, 81*b* second outer ring, 82*a*, 82*b*, 83*a*, 83*b* raceway surface, 84*a*, 84*b* cylindrical roller, 85*a*, 85*b* oil groove, 87*a* annular groove, 89*b* bolt hole, 90*a* outer pin housing groove, 90*b* slot, 91*a*, 91*b* wall surface, 92*a*, 92*b* nail, 93*a*, 93*b*, 94*a*, 94*b* end portion, 95*a*, 95*b* center portion, 96*b* relief portion,

97*a* oil sump, 101*a* cylindrical grinder, 102*a* grindstone part, 103*a* rotary dresser, 104*a*, 104*b* projection, 105*a*, 105*b* recess, 106*a* spindle.

The invention claimed is:

1. A speed reducer comprising:
- an input unit including an input shaft and a first bearing, the first bearing including an eccentric first inner ring that rotates together with the input shaft and a first outer ring that is located radially outward of the first inner ring;
- a cycloid gear located radially outward of the first bearing and including a plurality of external teeth arranged on an outer peripheral surface along circumferential directions, the cycloid gear including a first through hole the input unit penetrates and a plurality of second through holes located radially outward of the first through hole and arranged with intervals in the circumferential directions;
- a plurality of inner pins penetrating the second through holes in axial directions;
- an inner pin holder holding end portions of the plurality of inner pins in the axial directions and surrounding an outer peripheral surface of the input unit;
- a second bearing located radially outward of the cycloid gear, and including a second inner ring that is an output shaft, a second outer ring located radially outward of the second inner ring, and a rolling body located between the second inner ring and the second outer ring; and
- a plurality of outer pins held on a radially inner surface of the second inner ring and meshing with the external teeth of the cycloid gear, wherein
- the second through holes are elongated along the circumferential direction,
- the first inner ring is provided separately from the input shaft, and
- the input unit includes a movement restrictor that restricts movement of the first inner ring relative to the input shaft in the circumferential directions.

2. The speed reducer according to claim 1, wherein the movement restrictor restricts movement of the first inner ring relative to the input shaft in the axial directions.

3. The speed reducer according to claim 2, wherein the movement restrictor includes
- a first keyway recessed from an outer peripheral surface of the input shaft,
- a second keyway recessed from an inner peripheral surface of the first inner ring, and
- a key member fitted in both the first keyway and the second keyway.

4. The speed reducer according to claim 3, wherein
- the first keyway extends in the axial directions in a portion of the outer peripheral surface of the input shaft in the circumferential directions,
- the second keyway is located at a position facing the first keyway, and
- the key member has a rod shape extending in the axial directions.

5. The speed reducer according to claim 2, wherein at least an end portion of the first inner ring on one side in the axial directions includes a flange projecting radially outward.

6. The speed reducer according to claim 2, wherein the input unit further includes a guide ring that is provided separately from the input shaft and the first inner ring, has a disc shape, is located at least on one side of the first inner ring in the axial directions, and projects radially outward relative to a raceway surface of the first inner ring.

7. The speed reducer according to claim 2, wherein
- the first bearing comprises a pair of first bearings arranged in the axial directions, and
- the first inner ring comprises a pair of first inner rings included in the pair of first bearings, and the pair of first inner rings are arranged with a 180-degree phase shift in the circumferential directions.

8. The speed reducer according to claim 2, wherein the first inner ring is fixed to the input shaft by interference fitting.

9. The speed reducer according to claim 1, wherein the movement restrictor includes
- a first keyway recessed from an outer peripheral surface of the input shaft,
- a second keyway recessed from an inner peripheral surface of the first inner ring, and
- a key member fitted in both the first keyway and the second keyway.

10. The speed reducer according to claim 9, wherein
- the first keyway extends in the axial directions in a portion of the outer peripheral surface of the input shaft,
- the second keyway is located at a position facing the first keyway, and
- the key member has a rod shape extending in the axial directions.

11. The speed reducer according to claim 1, wherein at least an end portion of the first inner ring on one side in the axial directions includes a flange projecting radially outward.

12. The speed reducer according to claim 1, wherein the input unit further includes a guide ring that is provided separately from the input shaft and the first inner ring, has a disc shape, is located at least on one side of the first inner ring in the axial directions, and projects radially outward relative to a raceway surface of the first inner ring.

13. The speed reducer according to claim 1, wherein
- the first bearing comprises a pair of first bearings arranged in the axial directions, and
- the first inner ring comprises a pair of first inner rings included in the pair of first bearings, and the pair of first inner rings are arranged with a 180-degree phase shift in the circumferential directions.

14. The speed reducer according to claim 1, wherein the first inner ring is fixed to the input shaft by interference fitting.

15. The speed reducer according to claim 1, wherein the cycloid gear has external teeth with an epitrochoid parallel curve.

* * * * *